(12) United States Patent
Watanabe et al.

(10) Patent No.: US 9,713,935 B2
(45) Date of Patent: Jul. 25, 2017

(54) LAMINATED PRINTED MATTER

(71) Applicant: Sharp Kabushiki Kaisha, Sakai, Osaka (JP)

(72) Inventors: Hisashi Watanabe, Osaka (JP); Akiko Miyazaki, Osaka (JP); Kiyoshi Minoura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/125,991

(22) PCT Filed: Apr. 14, 2015

(86) PCT No.: PCT/JP2015/061403
§ 371 (c)(1),
(2) Date: Sep. 14, 2016

(87) PCT Pub. No.: WO2015/163180
PCT Pub. Date: Oct. 29, 2015

(65) Prior Publication Data
US 2017/0087916 A1 Mar. 30, 2017

(30) Foreign Application Priority Data

Apr. 21, 2014 (JP) ................. 2014-087473

(51) Int. Cl.
*B42D 15/00* (2006.01)
*B32B 3/10* (2006.01)
(Continued)

(52) U.S. Cl.
CPC ............. *B42D 15/00* (2013.01); *B32B 3/02* (2013.01); *B32B 3/10* (2013.01); *B32B 7/02* (2013.01);
(Continued)

(58) Field of Classification Search
CPC ......... B32B 3/02; B32B 3/10; B32B 2250/03; B32B 2250/04; Y10T 428/24851; Y10T 428/24868
See application file for complete search history.

(56) References Cited

U.S. PATENT DOCUMENTS

2001/0038493 A1* 11/2001 Watanabe ......... B29C 45/14827
359/609
2007/0059476 A1* 3/2007 Dronzek, Jr. ......... B44C 1/1733
428/40.1
(Continued)

FOREIGN PATENT DOCUMENTS

JP    H11-77874 A    3/1999
JP    2003280167 A   10/2003
(Continued)

OTHER PUBLICATIONS

International Search Report PCT/ISA/210 for International Application No. PCT/JP2015/061403 Dated Jun. 9, 2015.

Primary Examiner — Betelhem Shewareged
(74) Attorney, Agent, or Firm — Harness, Dickey & Pierce, P.L.C.

(57) ABSTRACT

A laminated printed matter is provided which is less likely to cause apparently white-tinged images and capable of restraining a decrease in image quality of the printed matter. The laminated printed matter includes a printed matter and an anti-reflection film. The anti-reflection film is attached to a viewing side surface of the printed matter. The laminated printed matter is provided with a frame-like region having a lower light transmittance than an anti-reflection surface of the anti-reflection film on an outer edge. Preferably, the anti-reflection film has, on a viewing side surface thereof, an anti-reflection structure with multiple protrusions disposed at a pitch not greater than the visible light wavelength.

9 Claims, 11 Drawing Sheets

(51) Int. Cl.
  *B32B 7/02*     (2006.01)
  *B32B 3/02*     (2006.01)
(52) U.S. Cl.
  CPC ....... *B32B 2250/03* (2013.01); *B32B 2250/04* (2013.01); *B32B 2307/412* (2013.01); *Y10T 428/24851* (2015.01); *Y10T 428/24868* (2015.01)

(56) References Cited

U.S. PATENT DOCUMENTS

| | | |
|---|---|---|
| 2010/0134733 A1 | 6/2010 | Watanabe et al. |
| 2010/0165467 A1* | 7/2010 | Thies ................ A47G 1/06 359/599 |
| 2012/0008213 A1 | 1/2012 | Tsuda et al. |
| 2012/0212825 A1 | 8/2012 | Nomura et al. |
| 2015/0177420 A1 | 6/2015 | Fujii et al. |
| 2017/0087916 A1* | 3/2017 | Watanabe ................ B32B 7/02 |

FOREIGN PATENT DOCUMENTS

| | | |
|---|---|---|
| JP | 4170688 B2 | 10/2008 |
| JP | 2012163723 A | 8/2012 |
| WO | WO-2009-019839 A1 | 2/2009 |
| WO | WO-2010113868 A1 | 10/2010 |
| WO | WO-2013/191092 A1 | 12/2013 |

* cited by examiner

LAMINATED PRINTED MATTER

TECHNICAL FIELD

The present invention relates to laminated printed matters. The present invention specifically relates to a laminated printed matter including a printed matter, such as a photograph, and an anti-reflection film attached to the surface thereof.

BACKGROUND ART

Black colors of film photos among printed matters look deeper so that the image quality thereof is high, but the incident light reflects on the surfaces thereof in bright places so that the visibility thereof may decrease. Thus, Patent Literatures 1 to 3, for example, each propose a laminated printed matter including such a printed matter and an anti-reflection layer disposed on the viewing side surface thereof. Examples of known anti-reflection layers include resin films and inorganic films with a monolayer or multi-layer structure of materials having different refractive indexes, as well as a moth-eye structure which is one of nanometer-scale rough structures (nanostructures) (for example, see Patent Literatures 4 to 6). The moth-eye structure may have a large number of nanometer-scale, substantially conical protrusions on the surface of a support. Such a moth-eye structure provides a continuously varying refractive index from the air layer to the support, significantly reducing reflected light. For good productivity, the anti-reflection layer is usually formed on a transparent support (hereinafter, the resulting workpiece is also referred to as an anti-reflection film), and then is closely attached to the viewing side surface of a printed matter in many cases.

CITATION LIST

Patent Literature

Patent Literature 1: JP 4170688 B
Patent Literature 2: JP 2003-280167 A
Patent Literature 3: JP H11-77874 A
Patent Literature 4: JP 2012-163723 A
Patent Literature 5: WO 2010/113868
Patent Literature 6: WO 2009/019839

SUMMARY OF INVENTION

Technical Problem

However, conventional laminated printed matters including an anti-reflection film disposed on the viewing side surface of a printed matter may suffer peeling of an edge (outer edge) of the anti-reflection film from the printed matter. As a result, the portion where the anti-reflection film is peeled gives an apparently white-tinged image, impairing the image quality of the printed matter. The inventors have studied the causes thereof to find the following facts.

FIG. 27 is a schematic plan view of a conventional laminated printed matter. The following will describe the case where an anti-reflection film is peeled from a printed matter in a region AR101 (frame-like region) at an outer edge of a laminated printed matter 101 while the anti-reflection film remains attached to the printed matter in a region AR102 (region other than the region AR101).

FIG. 28 is a schematic cross-sectional view of the cross section taken along the a-a' line shown in FIG. 27. As illustrated in FIG. 28, the laminated printed matter 101 includes, from the back side to the viewing side, a printed matter 102 and an anti-reflection film 103. The anti-reflection film 103 includes, from the back side to the viewing side, a support 105 and an anti-reflection layer 106, and is attached to the viewing side surface of the printed matter 102 with an adhesive layer 104 in between.

As illustrated in FIG. 28, the anti-reflection film 103 is peeled from the printed matter 102 in the region AR101. This is found to be caused by, for example, deformation, creases, and air bubbles sandwiched during attachment of the anti-reflection film 103 to the printed matter 102, damages due to cutting during formation of the edge surface of the laminated printed matter 101, and degradation over time. The anti-reflection layer 106 is tightly attached to the support 105, and thus the anti-reflection layer itself is rarely peeled off.

The region AR102 has a reflectance that is substantially equal to the percentage (visible light reflectance) of the visible light reflected to the visible light incident on the interface between the anti-reflection layer 106 and an air layer 107a, and is about 0.5% or lower. The region AR101 has a reflectance that is substantially equal to the sum of the visible light reflectance at the interface between the adhesive layer 104 and an air layer 107b (about 4%) and the visible light reflectance at the interface between the air layer 107b and the printed matter 102 (about 4%), and is about 8% (the visible light reflectance at the interface between the anti-reflection layer 106 and the air layer 107a, which is a relatively low value (about 0.5% or lower), is excluded). The inventors found that a great difference in reflectance between the regions AR101 and AR102 causes an apparently white-tinged image in the region AR101.

In order to solve such a problem of an apparently white-tinged image, the inventors have studied a method of forming an anti-reflection layer directly on a printed matter (this process is also referred to as film formation). If the anti-reflection layer is an inorganic film, however, the printed matter is damaged due to heat or plasma generated during the film formation. If the anti-reflection layer is a resin film (organic film), the printed matter is damaged due to, for example, a solvent contained in the resin. Thus, the inventors have found it difficult to form an anti-reflection layer directly while maintaining the image quality of the printed matter.

As mentioned above, no means has been found for solving the problem of an apparently white-tinged image in a frame-like region at the outer edge of a laminated printed matter including a printed matter and an anti-reflection film attached thereto. For example, the above Patent Literatures 1 to 3 include no description focusing on such apparently white-tinged images, and thus teach no means for solving the apparently white-tinged images. The same applies to the above Patent Literatures 4 to 6.

The present invention is devised in view of the above state of the art, and aims to provide a laminated printed matter that is less likely to cause apparently white-tinged images and capable of restraining a decrease in image quality of the printed matter.

Solution to Problem

The inventors performed various studies about laminated printed matters which are less likely to cause apparently white-tinged images and capable of restraining a decrease in image quality of the printed matters, and thereby focused on the configuration of a frame-like region at the outer edge of a laminated printed matter which is less likely to cause apparently white-tinged images. Then, the inventors found arrangement of a frame-like region having a higher reflectance or absorptivity, i.e., a lower light transmittance, than the anti-reflection surface of the anti-reflection film. Thereby, the inventors found that such a frame-like region can decrease the difference in reflectance between the area where the anti-reflection film is peeled from the printed matter and the area around the former area, less likely causing apparently white-tinged images. As a result, the inventors arrived at the solution of the above problem and completed the present invention.

Specifically, one aspect of the present invention may be a laminated printed matter including a printed matter, and an anti-reflection film, the anti-reflection film being attached to a viewing side surface of the printed matter, the laminated printed matter being provided with a frame-like region having a lower light transmittance than an anti-reflection surface of the anti-reflection film on an outer edge.

Advantageous Effects of Invention

The present invention can provide a laminated printed matter that is less likely to cause apparently white-tinged images and capable of restraining a decrease in image quality of the printed matter.

DESCRIPTION OF EMBODIMENTS

Figure 1:
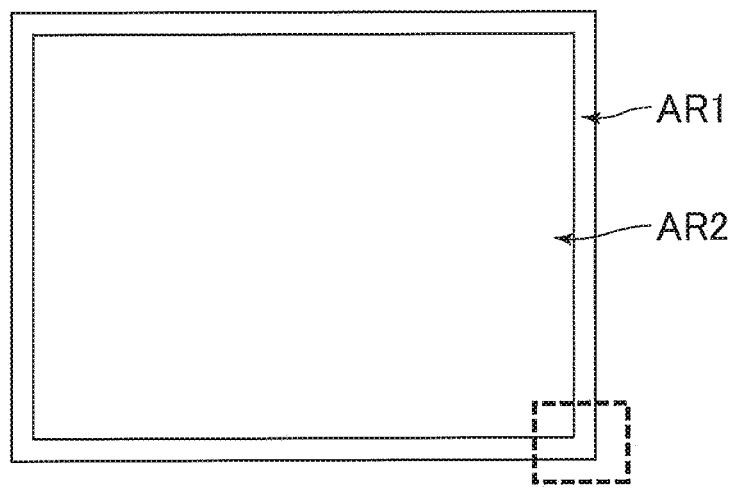
FIG. 1 is a schematic plan view of laminated printed matters of Embodiments 1 to 12.

The present invention will be mentioned in more detail referring to the drawings in the following embodiments, but is not limited to these embodiments. The configurations of the respective embodiments may be appropriately combined or modified as long as the combination or modification is not beyond the spirit of the present invention.

The term "highly transparent" herein means that the light transmittance is 80% or higher. The term "nontransparent" herein means that the light transmittance is 10% or lower. The term "reflectance" herein means a visible light reflectance relative to the incident visible light, unless otherwise mentioned.

Embodiment 1

Embodiment 1 provides a laminated printed matter including a printed matter and an anti-reflection film wherein a frame-like region disposed on an outer edge is a region where a coat is disposed in a frame shape.

(1) Structure of Laminated Printed Matter

FIG. 1 is a schematic plan view of a laminated printed matter of Embodiment 1. The following describes the case where the anti-reflection film is peeled from the printed matter in part of a region AR1 (frame-like region) of a laminated printed matter 1a while the anti-reflection film remains attached to the printed matter in the other region (including a region AR2). In the region AR1, a coat to be mentioned later is disposed in a frame shape.

Figure 2:
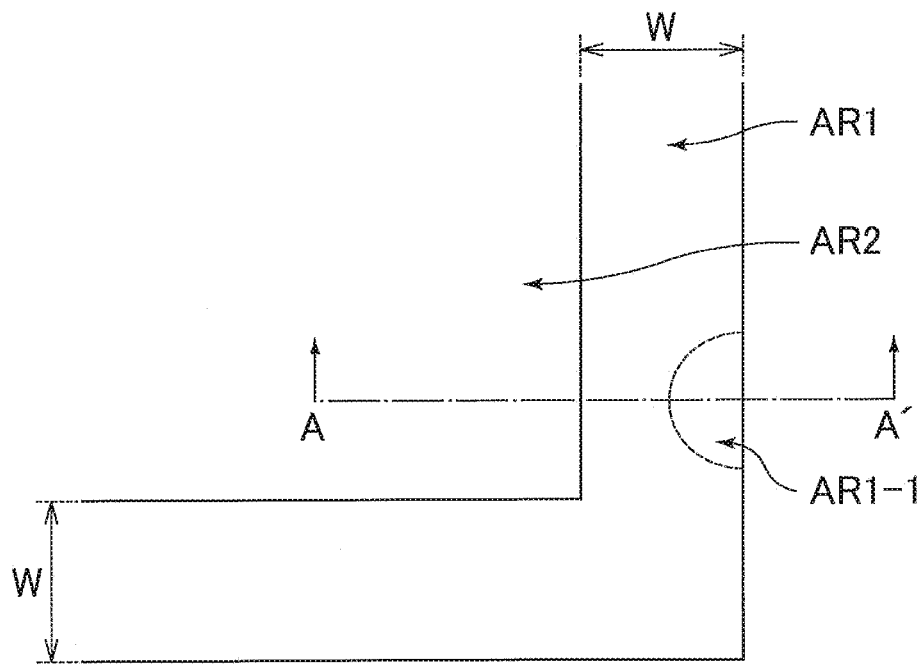
FIG. 2 is an enlarged view of a region surrounded by dashed lines in FIG. 1.

FIG. 2 is an enlarged view of a region surrounded by dashed lines in FIG. 1. As illustrated in FIG. 2, there is a region AR1-1 where the anti-reflection film is peeled from the printed matter in part of the region AR1.

Figure 3:
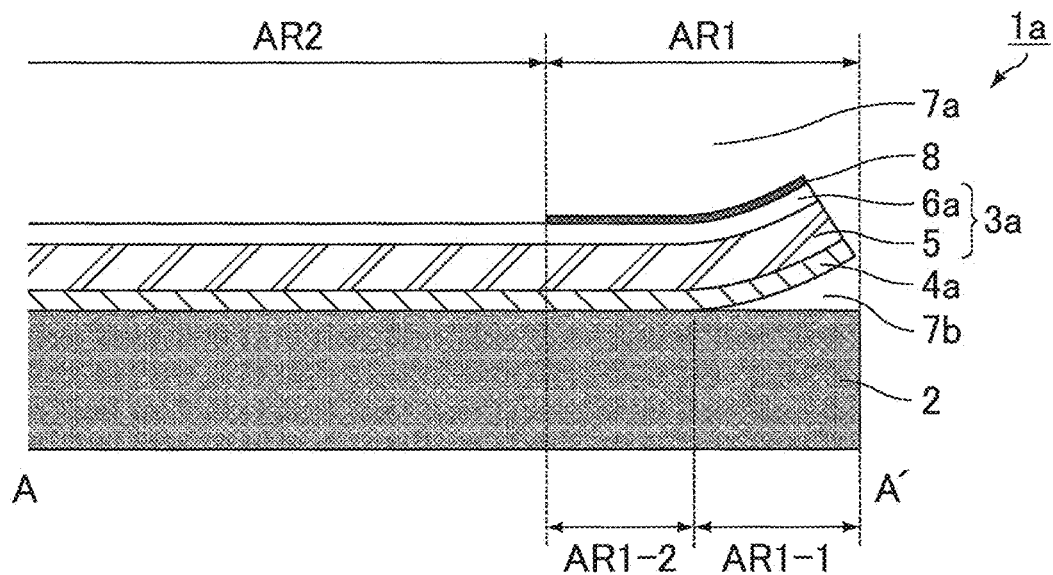
FIG. 3 is a schematic cross-sectional view of the cross section taken along the A-A' line shown in FIG. 2 (Embodiment 1).

FIG. 3 is a schematic cross-sectional view of the cross section taken along the A-A' line shown in FIG. 2 (Embodiment 1). As illustrated in FIG. 3, the laminated printed matter 1a includes, from the back side to the viewing side, a printed matter 2 and an anti-reflection film 3a. The anti-reflection film 3a includes, from the back side to the viewing side, a support 5 and an anti-reflection layer 6a, and is attached to the viewing side surface of the printed matter 2 with an adhesive layer 4a in between. A coat 8 is disposed on the viewing side surface of the anti-reflection film 3a in the region AR1. Thereby, the image of the printed matter 2 is observed in the region AR2. Since the laminated printed matter 1a is provided with the coat 8, it is a framed printed matter. An air layer 7a is a space at the viewing side of the laminated printed matter 1a. An air layer 7b is a space formed by peeling of the anti-reflection film 3a from the printed matter 2. The term "anti-reflection surface" herein means the viewing side surface of the anti-reflection film in a region other than the frame-like region at the outer edge of the laminated printed matter. In FIG. 3, the anti-reflection surface is the viewing side surface of the anti-reflection film 3a in the region AR2. The term "viewing surface" herein means the surface on the anti-reflection film side of the laminated printed matter, and the term "viewing side" means, in FIG. 3, the upper side of the laminated printed matter 1a. The term "back surface" herein means the surface opposite to the viewing surface of the laminated printed matter, and the term "back side" means, in FIG. 3, the lower side of the laminated printed matter 1a. The same shall apply to the other embodiments.

The printed matter 2 may be, for example, a photograph printed on any substrate such as paper or resin film. For example, it may be a printed matter prepared using a printing device available from Fujifilm Corp. (trade name: Frontier). The printed matter may be prepared by any printing method, such as offset printing, gravure printing, screen printing, inkjet printing, laser printing, or silver halide printing. The ink used for preparing the printed matter 2 may be either a pigment ink or a dye ink. In order to restrain the roughness on the surface of the printed matter 2 and make air bubbles less likely to be sandwiched during attachment of the printed matter 2 and the anti-reflection film 3a, a dye ink is preferred.

The anti-reflection layer 6a may be a resin film or an inorganic film, for example. If the anti-reflection layer 6a is formed from a resin film, the anti-reflection film 3a may be an anti-reflection film available from Panasonic Corp. (trade name: Fine Tiara), for example. Alternatively, the anti-reflection layer 6a formed from a resin film may have a structure in which a low refractive index resin and a high refractive index resin are stacked from the back side to the viewing side. If necessary, a large number of such layers may be stacked alternately. As the number of layers stacked increases, the reflectance decreases, and thus the ability to restrain the reflection is improved. In contrast, the cost increases. The low refractive index resin may be one prepared by thinly applying a fluorine-based resin, such as a low refractive index material available from JSR Corp. (trade name: OPSTAR). The high refractive index resin may be one prepared by thinly applying a high refractive index coating liquid available from Sumitomo Osaka Cement Co., Ltd., for example.

If the anti-reflection layer 6a is formed from an inorganic film, the anti-reflection film 3a may be an anti-reflection film available from Dexerials Corp., for example. In this case, the anti-reflection layer 6a may usually have a structure in which silicon dioxide ($SiO_2$), which constitutes a low refractive index film, and niobium pentoxide ($Nb_2O_5$), which constitutes a high refractive index film, are alternately stacked.

The support 5 may be a highly transparent material, and may be a polyethylene terephthalate (PET) film, for example.

The adhesive layer 4a may be usual one such as a highly transparent double-sided tape. Examples thereof include an adhesive film for optical materials available from Panac Co., Ltd. (trade name: Panaclean®) and an optical adhesive sheet available from Lintec Corp.

The coat 8 may be any one which makes the light transmittance of the region AR1 lower than the light transmittance of the anti-reflection surface of the anti-reflection film 3a. The coat 8 is preferably a film formed by printing, and may be one printed with a usual ink material, for example. The coat 8 may have any color and any pattern. They may be chosen depending on a user's liking. For example, the coat 8 with a white color has a high reflectance. The coat 8 with a black color has a low reflectance but has a high absorptivity.

The coat 8 may have any thickness, and is preferably 1 μm or greater and 100 μm or smaller in thickness. If the thickness of the coat 8 is smaller than 1 μm, the light transmittance of the region AR1 may fail to be sufficiently lower than that of the anti-reflection surface of the anti-reflection film 3a. If the thickness of the coat 8 is greater than 100 μm, parallax may disadvantageously occur between the region AR1 and the region AR2.

The region AR1, where the coat 8 is disposed, preferably has a width (corresponding to the width W in FIG. 2) of 1 mm or greater in consideration of the size of the region AR1-1 where the anti-reflection film 3a is peeled from the printed matter 2. In consideration of the ratio of the areas of the regions AR1 and AR2, the upper limit of the width is preferably such that the area of the region AR1 is 30% or smaller of the area of the entire printed matter 2 (the sum of the areas of the regions AR1 and AR2). For example, if the printed matter 2 is an L-size (89 mm×127 mm) photograph, the upper limit of the width W is preferably about 17 mm. If the area of the region AR1 occupies more than 30% of the area of the entire printed matter 2, the area of the region AR2, i.e., the area of the image of the printed matter 2 becomes small, and thus the appearance thereof may be disadvantageously strange.

With the laminated printed matter of Embodiment 1, the reflection on (or the absorption of light by) the coat 8 gives substantially the same reflectance to the region AR1-1 where the anti-reflection film 3a is peeled from the printed matter 2 and to the region AR1-2 adjacent to the region AR1-1. Thus, the laminated printed matter of Embodiment 1 can prevent apparently white-tinged images and completely prevent a decrease in image quality of the printed matter.

(2) Process of Producing Laminated Printed Matter

Figure 4:
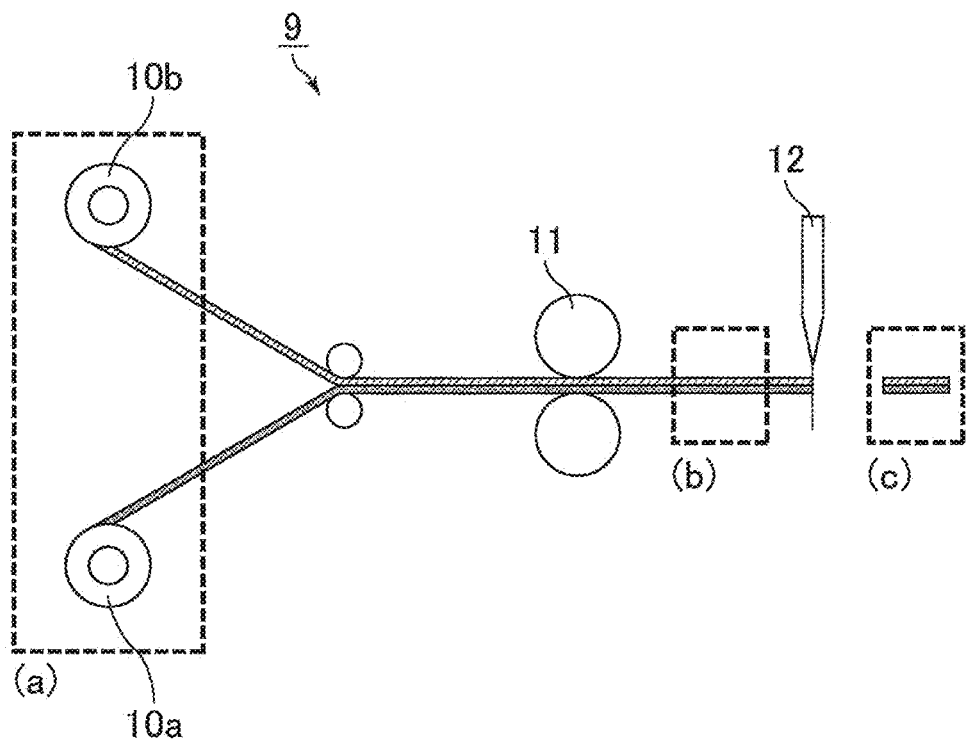
FIG. 4 is a schematic cross-sectional view illustrating a process of producing a laminated printed matter of Embodiment 1.
Figure 5:
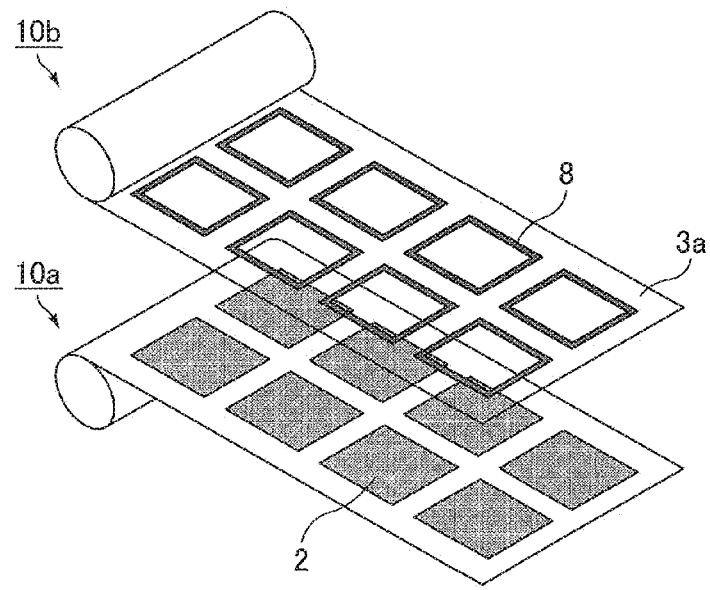
FIG. 5 is a schematic perspective view of the state in the section (a) in FIG. 4.
Figure 6:
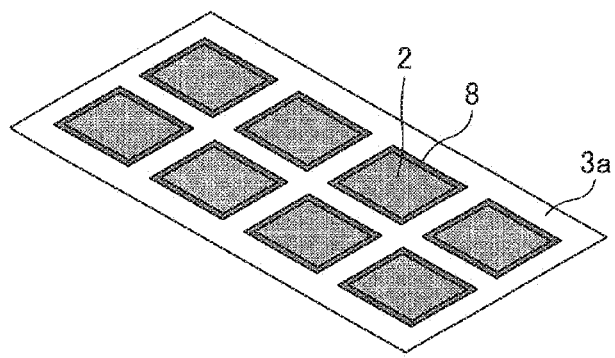
FIG. 6 is a schematic perspective view of the state in the section (b) in FIG. 4.
Figure 7:
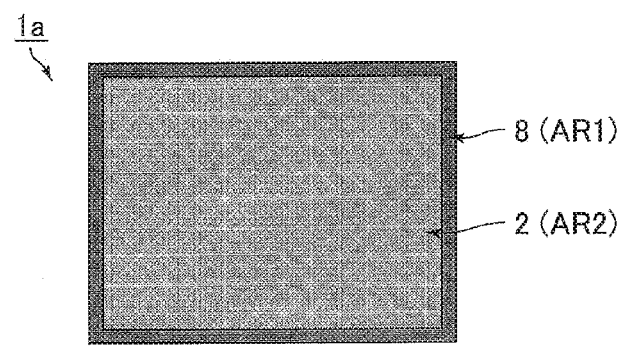
FIG. 7 is a schematic plan view of the state in the section (c) in FIG. 4.

FIG. 4 is a schematic cross-sectional view illustrating a process of producing a laminated printed matter of Embodiment 1. As illustrated in FIG. 4, a laminating device 9 is a device for press-attaching rolled-up sheets (10a and 10b) using rollers 11. Such a laminating device 9 may be a usual one, and may be a laminating device available from Fujipream Corp., for example. The following will describe the production process using the laminating device 9 with reference to the states in sections (a), (b), and (c), successively, in FIG. 4. FIG. 5 is a schematic perspective view of the state in the section (a) in FIG. 4. FIG. 6 is a schematic perspective view of the state in the section (b) in FIG. 4. FIG. 7 is a schematic plan view of the state in the section (c) in FIG. 4.

First, rolled-up sheets 10a and 10b as illustrated in FIG. 5 are prepared. The sheet 10a is a rolled-up sheet with multiple printed matters 2 formed thereon. The sheet 10b is a rolled-up sheet with multiple coats 8, each in a frame shape, formed on the viewing side surface of the anti-reflection film 3a, on which the anti-reflection layer is entirely formed, and with the adhesive layer 4a formed on the back side. To the back side of the sheet 10b (the back side of the adhesive layer 4a) is attached a release sheet (protective layer, not illustrated) for protecting the anti-reflection film 3a, i.e., for preventing sticking, damages, and stains. To the viewing side of the sheet 10b may also be attached an adhesive sheet (not illustrated) for protecting the anti-reflection film 3a. This has only to be removed afterward.

Next, the release sheet on the back side of the sheet 10b is peeled off and, as illustrated in FIG. 6, the sheets are press-attached using the rollers 11 while the relative positions of the printed matters 2 and the coats 8 are aligned. In this step, air bubbles may be less likely to be sandwiched by press-attaching the sheets with the rollers 11 heated up to about 50° C. to 70° C. depending on the roughness on the surfaces of the printed matters 2. FIG. 6 seems to include no anti-reflection film 3a disposed on the surfaces of the printed matters 2, but the anti-reflection film 3a is not illustrated for convenience because it is transparent. In fact, the anti-reflection film 3a is disposed on the surface of each printed matter 2. The same shall apply to FIG. 7.

Finally, the workpiece is cut into a predetermined size using a cutting unit 12 as illustrated in FIG. 4. Thereby, the laminated printed matter 1a as illustrated in FIG. 7 is completed. The cutting unit 12 may be a usual cutting system. For example, in the case of a die-cutting system, a Thomson die may be used.

The above description relates to the process for producing a laminated printed matter by press-attaching rolled-up sheets. The process for producing a laminated printed matter may be a process of attaching a printed matter and an anti-reflection film each in a predetermined shape. For example, a sheet-to-sheet attaching device available from Climb Products Co., Ltd. may be used.

Embodiment 2

Embodiment 2 relates to a laminated printed matter including a printed matter and an anti-reflection film. Difference from Embodiment 1 is the position of the coat disposed in the frame-like region. The laminated printed matter of Embodiment 2 is similar to the laminated printed matter of Embodiment 1 except for the above configuration, and thus the same points are not described here.

(1) Structure of Laminated Printed Matter

Schematic plan views of the laminated printed matter of Embodiment 2 are similar to FIG. 1 and FIG. 2. In the region AR1, a coat to be mentioned later is disposed in a frame shape.

Figure 8:
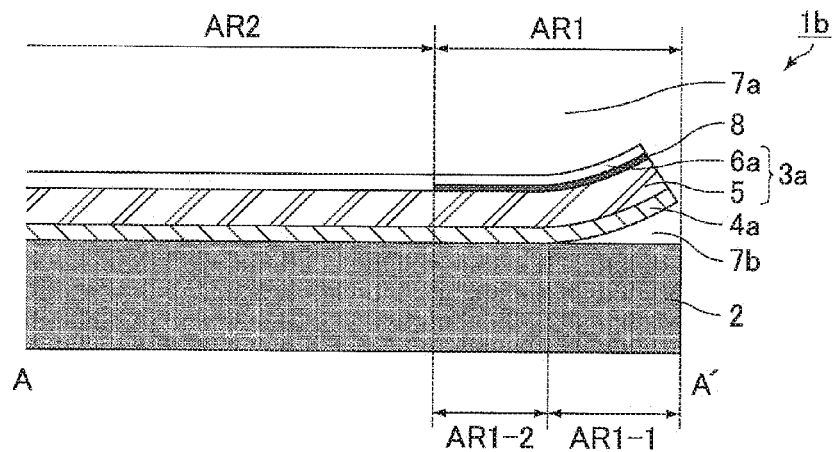
FIG. 8 is a schematic cross-sectional view of the cross section taken along the A-A' line shown in FIG. 2 (Embodiment 2).

FIG. 8 is a schematic cross-sectional view of the cross section taken along the A-A' line shown in FIG. 2 (Embodiment 2). As illustrated in FIG. 8, a laminated printed matter 1b includes, from the back side to the viewing side, the printed matter 2 and the anti-reflection film 3a. The anti-reflection film 3a includes, from the back side to the viewing side, the support 5 and the anti-reflection layer 6a, and is attached to the viewing side surface of the printed matter 2 with the adhesive layer 4a in between. The coat 8 is disposed between the support 5 and the anti-reflection layer 6a in the region AR1. Thereby, the image of the printed matter 2 is observed in the region AR2. Since the laminated printed matter 1b is provided with the coat 8, it is a framed printed matter. The air layer 7a is a space at the viewing side of the laminated printed matter 1b. The air layer 7b is a space formed by peeling of the anti-reflection film 3a from the printed matter 2.

The coat 8 may have any thickness, and is preferably 1 μm or greater and 20 μm or smaller in thickness. If the thickness of the coat 8 is smaller than 1 μm, the light transmittance of the region AR1 may fail to be sufficiently lower than that of the anti-reflection surface of the anti-reflection film 3a. If the thickness of the coat 8 is greater than 20 μm, a step is formed by the coat 8, possibly causing defects such as sandwiching of air bubbles during formation of the anti-reflection layer 6a. Further, parallax may disadvantageously occur between the region AR1 and the region AR2.

With the laminated printed matter of Embodiment 2, the reflection on (or the absorption of light by) the coat 8 gives substantially the same reflectance to the region AR1-1 where the anti-reflection film 3a is peeled from the printed matter 2 and to the region AR1-2 adjacent to the region AR1-1. Thus, the laminated printed matter of Embodiment 2 can prevent apparently white-tinged images and completely prevent a decrease in image quality of the printed matter. Further, in the case of the laminated printed matter of Embodiment 2, unlike the laminated printed matter of Embodiment 1, the viewing side surface in the region AR1 also serves as the anti-reflection layer 6a. Thus, the laminated printed matter causes less surface reflection and, if the coat 8 has a color with low reflectance, such as black, the laminated printed matter can have good appearance.

(2) Process of Producing Laminated Printed Matter

The process for producing the laminated printed matter of Embodiment 2 is similar to the process for producing the laminated printed matter of Embodiment 1 except for using, as the sheet 10b illustrated in FIG. 5, a rolled-up sheet with multiple coats 8, each in a frame shape, formed between the support 5 and the anti-reflection layer 6a of the anti-reflection film 3a. In this case, each coat 8 may be formed in a frame shape on the viewing side surface of the support 5 in advance, or may be formed in a frame shape on the back side of the anti-reflection layer 6a in advance.

Embodiment 3

Embodiment 3 relates to a laminated printed matter including a printed matter and an anti-reflection film. Difference from Embodiment 1 is the position of the coat disposed in the frame-like region. The laminated printed matter of Embodiment 3 is similar to the laminated printed matter of Embodiment 1 except for the above configuration, and thus the same points are not described here.

(1) Structure of Laminated Printed Matter

Schematic plan views of the laminated printed matter of Embodiment 3 are similar to FIG. 1 and FIG. 2. In the region AR1, a coat to be mentioned later is disposed in a frame shape.

Figure 9:
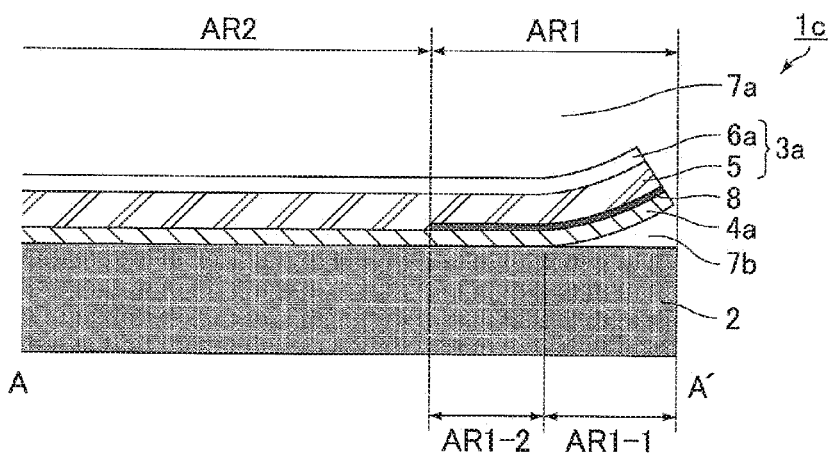
FIG. 9 is a schematic cross-sectional view of the cross section taken along the A-A' line shown in FIG. 2 (Embodiment 3).

FIG. 9 is a schematic cross-sectional view of the cross section taken along the A-A' line shown in FIG. 2 (Embodiment 3). As illustrated in FIG. 9, a laminated printed matter 1c includes, from the back side to the viewing side, the printed matter 2 and the anti-reflection film 3a. The anti-reflection film 3a includes, from the back side to the viewing side, the support 5 and the anti-reflection layer 6a, and is attached to the viewing side surface of the printed matter 2 with the adhesive layer 4a in between. The coat 8 is disposed on the back side of the support 5 (between the support 5 and the adhesive layer 4a) in the region AR1. Thereby, the image of the printed matter 2 is observed in the region AR2. Since the laminated printed matter 1c is provided with the coat 8, it is a framed printed matter. The air layer 7a is a space at the viewing side of the laminated printed matter 1c. The air layer 7b is a space formed by peeling of the anti-reflection film 3a from the printed matter 2.

The coat 8 may have any thickness, and is preferably 1 µm or greater and 20 µm or smaller in thickness. If the thickness of the coat 8 is smaller than 1 µm, the light transmittance of the region AR1 may fail to be sufficiently lower than that of the anti-reflection surface of the anti-reflection film 3a. If the thickness of the coat 8 is greater than 20 µm, a step is formed by the coat 8, which also forms a step on the adhesive layer 4a. This may cause defects such as sandwiching of air bubbles during attachment of the printed matter 2 and the anti-reflection film 3a. However, the anti-reflection layer 6a has no step unlike Embodiments 1 and 2. Thus, no parallax occurs between the region AR1 and the region AR2.

With the laminated printed matter of Embodiment 3, the reflection on (or the absorption of light by) the coat 8 gives substantially the same reflectance to the region AR1-1 where the anti-reflection film 3a is peeled from the printed matter 2 and to the region AR1-2 adjacent to the region AR1-1. Thus, the laminated printed matter of Embodiment 3 can prevent apparently white-tinged images and completely prevent a decrease in image quality of the printed matter. Further, in the case of the laminated printed matter of Embodiment 3, unlike the laminated printed matter of Embodiment 1, the viewing side surface in the region AR1 also serves as the anti-reflection layer 6a. Thus, the laminated printed matter causes less surface reflection and, if the coat 8 has a color with low reflectance, such as black, the laminated printed matter can have good appearance.

(2) Process of Producing Laminated Printed Matter

The process for producing the laminated printed matter of Embodiment 3 is similar to the process for producing the laminated printed matter of Embodiment 1 except for using, as the sheet 10b illustrated in FIG. 5, a rolled-up sheet with multiple coats 8, each in a frame shape, formed on the back side of the support 5 of the anti-reflection film 3a.

Embodiment 4

Embodiment 4 relates to a laminated printed matter including a printed matter and an anti-reflection film. Difference from Embodiment 1 is the position of the coat disposed in the frame-like region. The laminated printed matter of Embodiment 4 is similar to the laminated printed matter of Embodiment 1 except for the above configuration, and thus the same points are not described here.

(1) Structure of Laminated Printed Matter

Schematic plan views of the laminated printed matter of Embodiment 4 are similar to FIG. 1 and FIG. 2. In the region AR1, a coat to be mentioned later is disposed in a frame shape.

Figure 10:
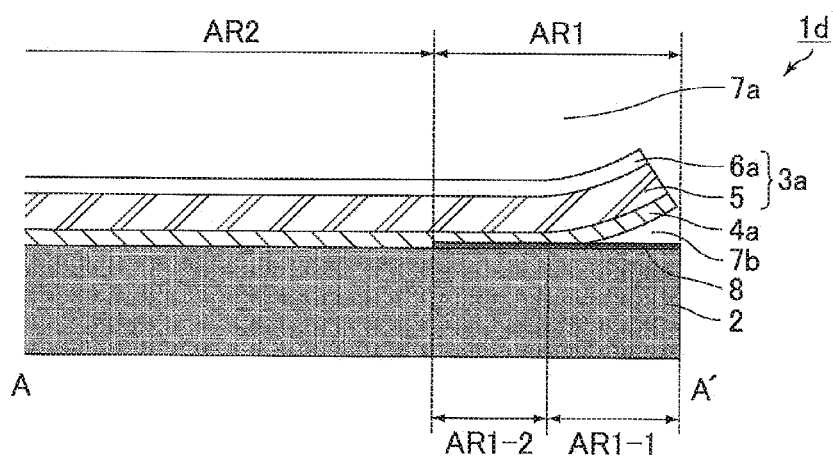
FIG. 10 is a schematic cross-sectional view of the cross section taken along the A-A' line shown in FIG. 2 (Embodiment 4).

FIG. 10 is a schematic cross-sectional view of the cross section taken along the A-A' line shown in FIG. 2 (Embodiment 4). As illustrated in FIG. 10, a laminated printed matter 1d includes, from the back side to the viewing side, the printed matter 2 and the anti-reflection film 3a. The anti-reflection film 3a includes, from the back side to the viewing side, the support 5 and the anti-reflection layer 6a, and is attached to the viewing side surface of the printed matter 2 with the adhesive layer 4a in between. The coat 8 is disposed on the viewing side surface of the printed matter 2 (between the printed matter 2 and the adhesive layer 4a) in the region AR1. Thereby, the image of the printed matter 2 is observed in the region AR2. Since the laminated printed matter 1d is provided with the coat 8, it is a framed printed matter. The air layer 7a is a space at the viewing side of the laminated printed matter 1d. The air layer 7b is a space formed by peeling of the anti-reflection film 3a from the printed matter 2.

The coat 8 may have any thickness, and is preferably 1 µm or greater and 20 µm or smaller in thickness. If the thickness of the coat 8 is smaller than 1 µm, the light transmittance of the region AR1 may fail to be sufficiently lower than that of the anti-reflection surface of the anti-reflection film 3a. If the thickness of the coat 8 is greater than 20 µm, a step is formed by the coat 8, likely causing defects such as sandwiching of air bubbles during attachment of the printed matter 2 and the anti-reflection film 3a.

Since the coat 8 is disposed on the back side of the air layer 7b, the laminated printed matter of Embodiment 4, unlike the laminated printed matters of Embodiments 1 to 3, fails to give substantially the same reflectances to the region AR1-1 where the anti-reflection film 3a is peeled from the printed matter 2 and to the region AR1-2 adjacent to the region AR1-1, but can reduce the difference in reflectance between the regions. Thus, the laminated printed matter of Embodiment 4 is less likely to cause apparently white-tinged images and capable of restraining a decrease in image quality of the printed matter. In order to further restrain apparently white-tinged images, the coat 8 preferably has a color with high reflectance, such as white. This can further reduce the difference in reflectance between the regions AR1-1 and AR1-2.

(2) Process of Producing Laminated Printed Matter

The process for producing the laminated printed matter of Embodiment 4 is similar to the process for producing the laminated printed matter of Embodiment 1 except for forming the coat 8 in a frame shape on the viewing side surface of the printed matter 2 of the sheet 10a instead of the sheet 10b illustrated in FIG. 5. In this case, processing of the anti-reflection film 3a (formation of the coat 8) is not necessary. Thus, production of the laminated printed matter is easier than in Embodiment 1 to 3.

Embodiment 5

Embodiment 5 relates to a laminated printed matter including a printed matter and an anti-reflection film. Difference from Embodiment 1 is that the frame-like region disposed on the outer edge is a region where the support of the anti-reflection film is disposed and the anti-reflection layer of the anti-reflection film is not disposed. The laminated printed matter of Embodiment 5 is similar to the laminated printed matter of Embodiment 1 except for the above configuration, and thus the same points are not described here.

(1) Structure of Laminated Printed Matter

Schematic plan views of the laminated printed matter of Embodiment 5 are similar to FIG. 1 and FIG. 2. As mentioned later, the region AR1 is provided with the support of the anti-reflection film but is not provided with the anti-reflection layer of the anti-reflection film.

Figure 11:
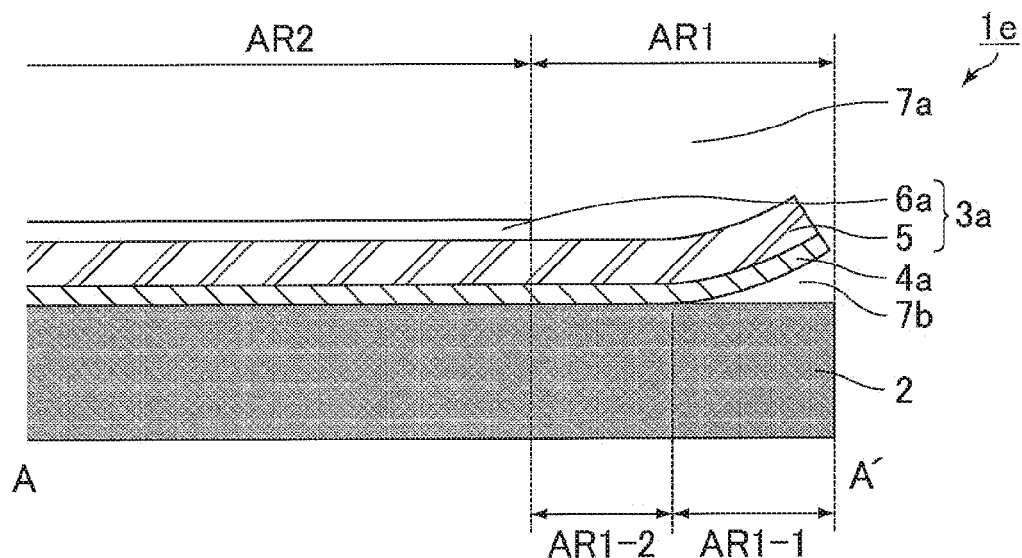
FIG. 11 is a schematic cross-sectional view of the cross section taken along the A-A' line shown in FIG. 2 (Embodiment 5).

FIG. 11 is a schematic cross-sectional view of the cross section taken along the A-A' line shown in FIG. 2 (Embodiment 5). As illustrated in FIG. 11, a laminated printed matter 1e includes, from the back side to the viewing side, the printed matter 2 and the anti-reflection film 3a. The anti-reflection film 3a includes, from the back side to the viewing side, the support 5 and the anti-reflection layer 6a, and is attached to the viewing side surface of the printed matter 2 with the adhesive layer 4a in between. The region AR1 is provided with the support 5 but is not provided with the anti-reflection layer 6a. The air layer 7a is a space at the viewing side of the laminated printed matter 1e. The air layer 7b is a space formed by peeling of the anti-reflection film 3a from the printed matter 2.

Similar to the portion corresponding to the region AR2, an image may be printed on at least part of the portion corresponding to the region AR1 of the printed matter 2. In this case, no anti-reflection layer 6a is disposed in the region AR1 and the image is observed through a highly transparent support 5. Thus, the image quality in the region AR1 may be disadvantageously lower than the image quality in the region AR2. In order to give good appearance, the region of the printed matter 2 where the image is printed preferably corresponds to the region where the anti-reflection layer 6a is disposed in a plan view seen from the viewing side. This can be achieved by forming a region of the printed matter 2 where the image is printed and the anti-reflection layer 6a in the same size and attaching them while aligning the positions. The portion corresponding to the region AR1 of the printed matter 2 may have a certain color or pattern printed thereon, or may not have such a printed color or pattern and allow the color of the substrate (e.g., white color in the case of paper) to be observed.

The region AR1 preferably has a width (corresponding to the width W in FIG. 2) of 1 mm or greater in consideration of the size of the region AR1-1 where the anti-reflection film 3a is peeled from the printed matter 2. If no image is printed on a portion corresponding to the region AR1 of the printed matter 2, in consideration of the ratio of the areas of the regions AR1 and AR2, the upper limit of the width is preferably such that the area of the region AR1 is 30% or smaller of the area of the entire printed matter 2 (the sum of the areas of the regions AR1 and AR2). For example, if the printed matter 2 is an L-size (89 mm×127 mm) photograph, the upper limit of the width W is preferably about 17 mm. If the area of the region AR1 occupies more than 30% of the area of the entire printed matter 2, the area of the region AR2, i.e., the area of the image of the printed matter 2 becomes small, and thus the appearance thereof may be disadvantageously strange.

Figure 28:
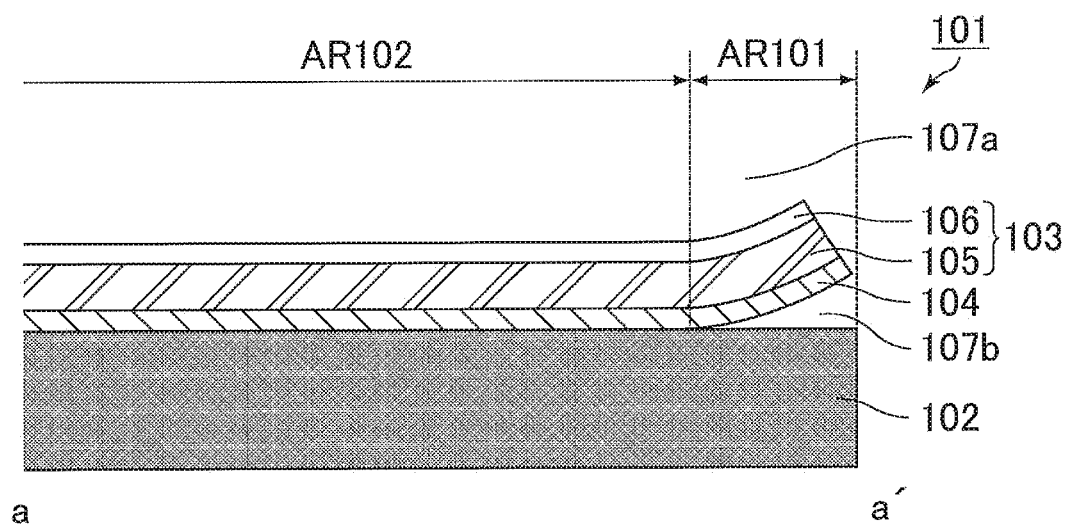
FIG. 28 is a schematic cross-sectional view of the cross section taken along the a-a' line shown in FIG. 27.

In the laminated printed matter of Embodiment 5, the reflectance of the region AR1-1 where the anti-reflection film 3a is peeled from the printed matter 2 is substantially equal to the sum of the reflectance at the interface between the air layer 7a and the support 5 (about 4%), the reflectance at the interface between the adhesive layer 4a and the air layer 7b (about 4%), and the reflectance at the interface between the air layer 7b and the printed matter 2 (about 4%), and is about 12%. The reflectance of the region AR1-2 adjacent to the region AR1-1 is substantially equal to the reflectance at the interface between the air layer 7a and the support 5, and is about 4%. Human eyes tend to be logarithmically sensitive to the reflectance. Thus, they feel that the difference in reflectance between the regions AR1-1 and AR1-2 in the present embodiment is smaller than the difference in reflectance between the regions AR101 and AR102 in the case where the anti-reflection layer is formed on the entire surface as illustrated in FIG. 28. Thus, the laminated printed matter of Embodiment 5 is less likely to cause apparently white-tinged images and capable of restraining a decrease in image quality of the printed matter.

(2) Process of Producing Laminated Printed Matter

Figure 12:
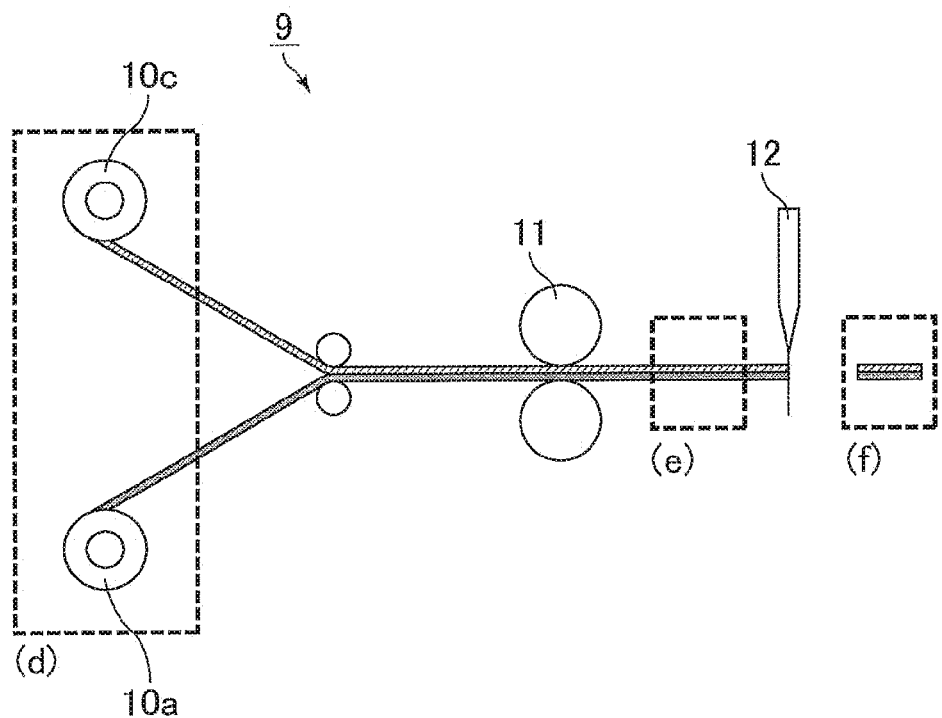
FIG. 12 is a schematic cross-sectional view illustrating a process of producing a laminated printed matter of Embodiment 5.
Figure 13:
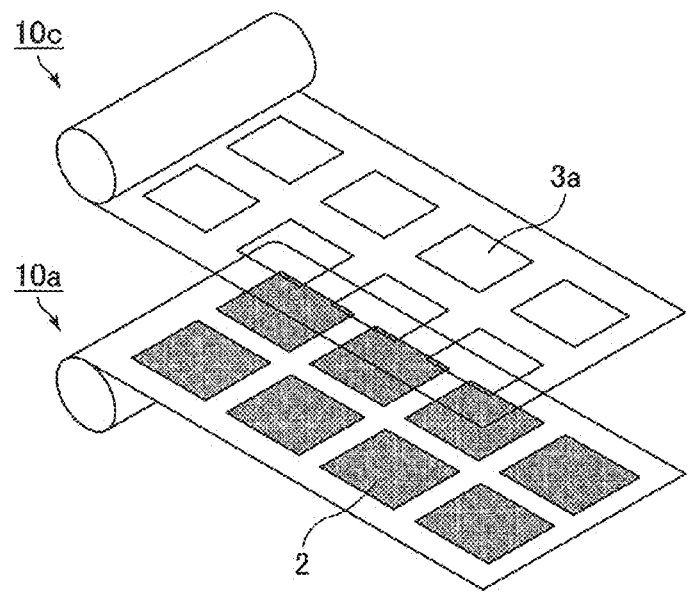
FIG. 13 is a schematic perspective view of the state in the section (d) in FIG. 12.
Figure 14:
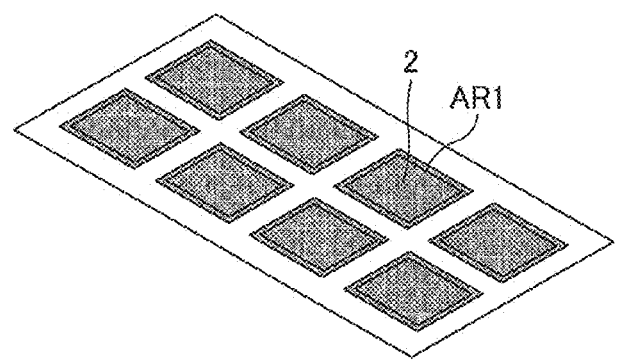
FIG. 14 is a schematic perspective view of the state in the section (e) in FIG. 12.
Figure 15:
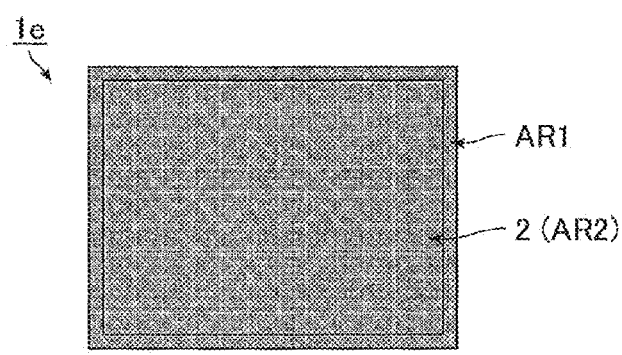
FIG. 15 is a schematic plan view of the state in the section (f) in FIG. 12.

FIG. 12 is a schematic cross-sectional view illustrating a process of producing the laminated printed matter of Embodiment 5. As illustrated in FIG. 12, the laminating device 9 is a device for press-attaching rolled-up sheets (10a and 10c) using the rollers 11. The following will describe the production process using the laminating device 9 with reference to the states in sections (d), (e), and (f), successively, in FIG. 12. FIG. 13 is a schematic perspective view of the state in the section (d) in FIG. 12. FIG. 14 is a schematic perspective view of the state in the section (e) in FIG. 12. FIG. 15 is a schematic plan view of the state in the section (f) in FIG. 12.

First, rolled-up sheets 10a and 10c as illustrated in FIG. 13 are prepared. The sheet 10a is a rolled-up sheet with multiple printed matters 2 formed thereon. The sheet 10c is a rolled-up sheet in which the anti-reflection layer 6a is not formed in a frame shape on the outer edge of the anti-reflection film 3a but the adhesive layer 4a is formed on the back side. To the back side of the sheet 10c (the back side of the adhesive layer 4a) is attached a release sheet (protective layer, not illustrated) for protecting the anti-reflection film 3a. To the viewing side of the sheet 10c (the viewing side of the anti-reflection film 3a) may also be attached an adhesive sheet (not illustrated) for protecting the anti-reflection film 3a. This has only to be removed afterward.

Next, the release sheet on the back side of the sheet 10c is peeled off and, as illustrated in FIG. 14, the sheets are press-attached using the rollers 11 while the relative positions of the printed matters 2 and the anti-reflection films 3a are aligned. FIG. 14 seems to include no anti-reflection film 3a disposed on the surface of the printed matter 2, but the anti-reflection film 3a is not illustrated for convenience because it is transparent. In fact, the anti-reflection film 3a with no anti-reflection layer 6a formed in the region AR1 is disposed on the surface of the printed matter 2. The same shall apply to FIG. 15.

Finally, the workpiece is cut into a predetermined size using the cutting unit 12 as illustrated in FIG. 12. Thereby, the laminated printed matter 1e as illustrated in FIG. 15 is completed.

The process for producing the laminated printed matter of Embodiment 5 includes only forming the anti-reflection film 3a in which the anti-reflection layer 6a is not formed in a frame shape on the outer edge, and then attaching the film with the printed matter 2 while aligning the relative positions, and does not require formation of a new film (layer) such as the coat 8 as already mentioned above. Thus, production of the laminated printed matter is easier than in Embodiments 1 to 4.

Embodiment 6

Embodiment 6 relates to a laminated printed matter including a printed matter and an anti-reflection film. Difference from Embodiment 1 is that the frame-like region disposed on the outer edge is a region where an adhesive sheet is disposed in a frame shape on the viewing side surface of the anti-reflection film. The laminated printed matter of Embodiment 6 is similar to the laminated printed matter of Embodiment 1 except for the above configuration, and thus the same points are not described here.

(1) Structure of Laminated Printed Matter

Schematic plan views of the laminated printed matter of Embodiment 6 are similar to FIG. 1 and FIG. 2. In the region AR1, an adhesive sheet to be mentioned later is disposed on the viewing side surface of the anti-reflection film.

Figure 16:
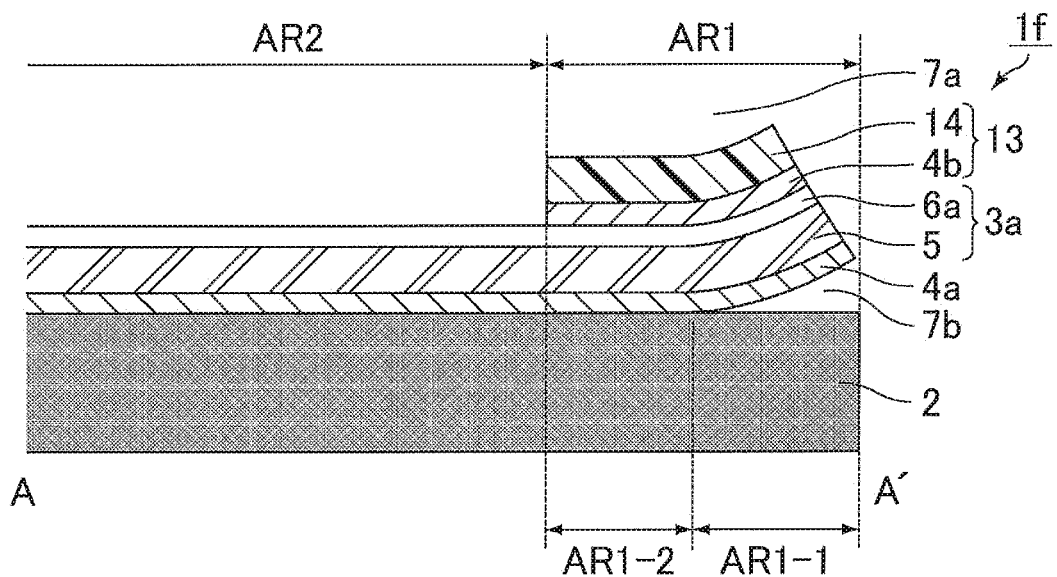
FIG. 16 is a schematic cross-sectional view of the cross section taken along the A-A' line shown in FIG. 2 (Embodiment 6).

FIG. 16 is a schematic cross-sectional view of the cross section taken along the A-A' line shown in FIG. 2 (Embodiment 6). As illustrated in FIG. 16, a laminated printed matter 1f includes, from the back side to the viewing side, the printed matter 2 and the anti-reflection film 3a. The anti-reflection film 3a includes, from the back side to the viewing side, the support 5 and the anti-reflection layer 6a, and is attached to the viewing side surface of the printed matter 2 with the adhesive layer 4a in between. An adhesive sheet 13 is disposed on the viewing side surface of the anti-reflection film 3a in the region AR1. The adhesive sheet 13 includes, from the back side to the viewing side, an adhesive layer 4b and a protective layer 14 (release sheet). The air layer 7a is a space at the viewing side of the laminated printed matter 1f. The air layer 7b is a space formed by peeling of the anti-reflection film 3a from the printed matter 2.

The adhesive sheet 13 is an adhesive sheet for protecting the anti-reflection film 3a, i.e., for preventing sticking, damages, and stains. The adhesive layer 4b may be similar to the adhesive layer 4a.

The protective layer 14 may be a highly transparent one or may be a nontransparent one. If the protective layer 14 is a highly transparent one, the adhesive sheet 13 may be a low adhesion tape available from Lintec Corp., for example. If the protective layer 14 is a nontransparent one, the adhesive sheet 13 may be a low adhesion tape formed from a colored substrate or a low adhesion tape decorated by a technique such as printing, for example. In order to enjoy the effects of the present invention sufficiently, the protective layer 14 is preferably a nontransparent one. If the protective layer 14 is a nontransparent one, the laminated printed matter 1f is a framed printed matter.

Similar to the portion corresponding to the region AR2, an image may be printed on at least part of the portion corresponding to the region AR1 of the printed matter 2. If the adhesive sheet 13 is a highly transparent one, the image is observed through the adhesive sheet 13. Thus, the image quality in the region AR1 may be disadvantageously lower than the image quality in the region AR2. In order to give good appearance, the region of the printed matter 2 where the image is printed preferably corresponds to the region where no adhesive sheet 13 is disposed in a plan view seen from the viewing side. This can be achieved by attaching the printed matter 2 and the combination of the anti-reflection film 3a and the adhesive sheet 13, and then peeling part of the adhesive sheet 13 to the size of the region of the printed matter 2 where the image is printed. The portion corresponding to the region AR1 of the printed matter 2 may have a certain color or pattern printed thereon, or may not have such a printed color or pattern and allow the color of the substrate (e.g., white color in the case of paper) to be observed.

The region AR1 preferably has a width (corresponding to the width W in FIG. 2) of 1 mm or greater in consideration of the size of the region AR1-1 where the anti-reflection film 3a is peeled from the printed matter 2. If no image is printed on a portion corresponding to the region AR1 of the printed matter 2, in consideration of the ratio of the areas of the regions AR1 and AR2, the upper limit of the width is preferably such that the area of the region AR1 is 30% or smaller of the area of the entire printed matter 2 (the sum of the areas of the regions AR1 and AR2). For example, if the printed matter 2 is an L-size (89 mm×127 mm) photograph, the upper limit of the width W is preferably about 17 mm. If the area of the region AR1 occupies more than 30% of the area of the entire printed matter 2, the area of the region AR2, i.e., the area of the image of the printed matter 2 becomes small, and thus the appearance thereof may be disadvantageously strange.

In the laminated printed matter of Embodiment 6, the reflectance of the region AR1-1 where the anti-reflection film 3a is peeled from the printed matter 2 is substantially equal to the sum of the reflectance at the interface between the air layer 7a and the protective layer 14 (about 4%), the reflectance at the interface between the adhesive layer 4a and the air layer 7b (about 4%), and the reflectance at the interface between the air layer 7b and the printed matter 2 (about 4%), and is about 12%. The reflectance of the region AR1-2 adjacent to the region AR1-1 is substantially equal to the reflectance at the interface between the air layer 7a and the protective layer 14, and is about 4%. Human eyes tend to be logarithmically sensitive to the reflectance. Thus, they feel that the difference in reflectance between the regions AR1-1 and AR1-2 in the present embodiment is smaller than the difference in reflectance between the regions AR101 and AR102 in the case where the anti-reflection layer is formed on the entire surface as illustrated in FIG. 28. Thus, the laminated printed matter of Embodiment 6 is less likely to cause apparently white-tinged images and capable of restraining a decrease in image quality of the printed matter. In order to further restrain apparently white-tinged images, the adhesive sheet 13 is preferably a nontransparent one.

(2) Process of Producing Laminated Printed Matter

Figure 17:
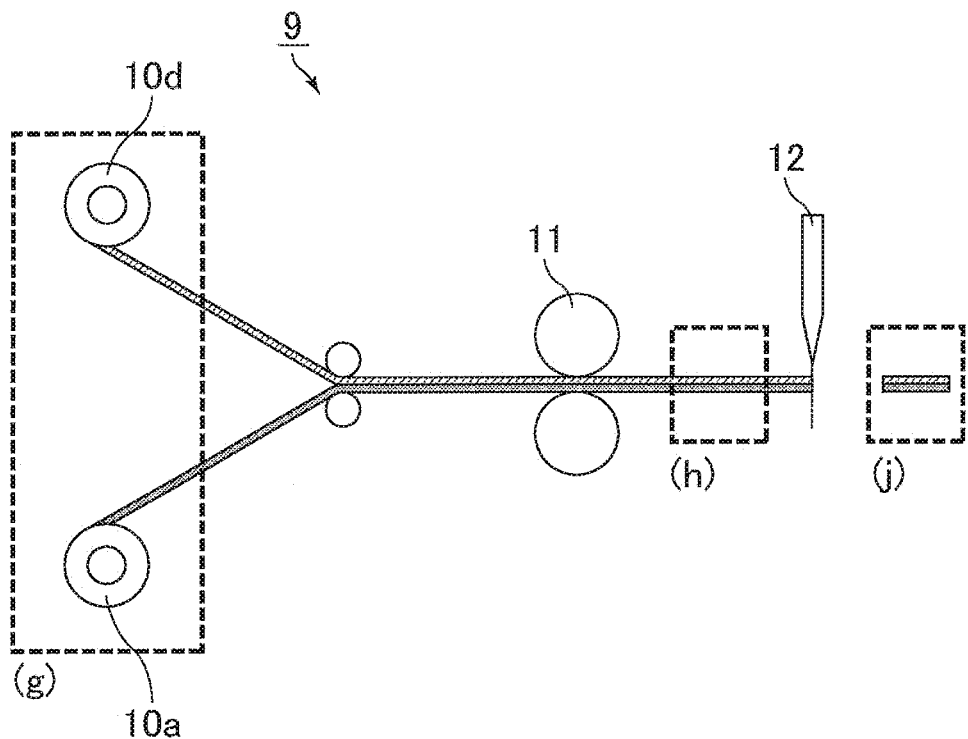
FIG. 17 is a schematic cross-sectional view illustrating a process of producing a laminated printed matter of Embodiment 6.
Figure 18:
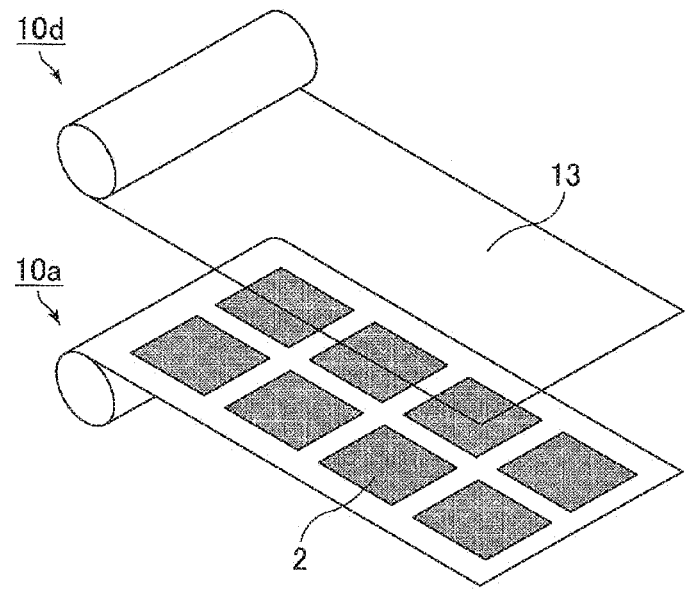
FIG. 18 is a schematic perspective view of the state in the section (g) in FIG. 17.
Figure 19:
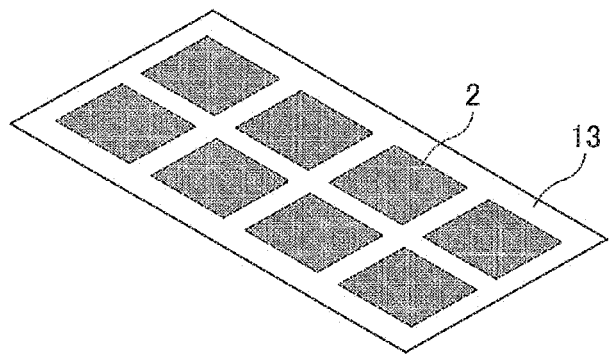
FIG. 19 is a schematic perspective view of the state in the section (h) in FIG. 17.
Figure 20:
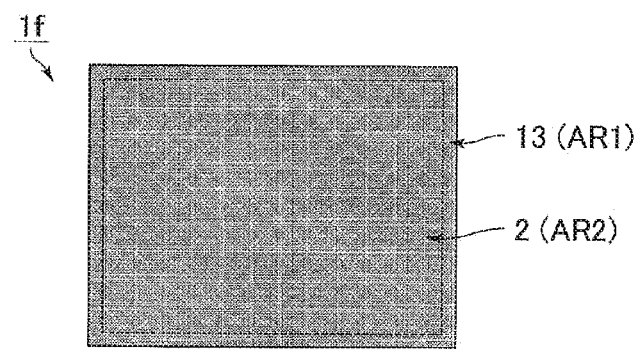
FIG. 20 is a schematic plan view of the state in the section (j) in FIG. 17.

FIG. 17 is a schematic cross-sectional view illustrating a process of producing the laminated printed matter of Embodiment 6. As illustrated in FIG. 17, the laminating device 9 is a device for press-attaching rolled-up sheets (10a and 10d) using the rollers 11. The following will describe the production process using the laminating device 9 with reference to the states in sections (g), (h), and (j), successively, in FIG. 17. FIG. 18 is a schematic perspective view of the state in the section (g) in FIG. 17. FIG. 19 is a schematic perspective view of the state in the section (h) in FIG. 17. FIG. 20 is a schematic plan view of the state in the section (j) in FIG. 17.

First, rolled-up sheets 10a and 10d as illustrated in FIG. 18 are prepared. The sheet 10a is a rolled-up sheet with multiple printed matters 2 formed thereon. The sheet 10d is a rolled-up sheet with the adhesive sheet 13 attached to the viewing side surface of the anti-reflection film 3a formed on the entire surface and with the adhesive layer 4a formed on the back side. To the back side of the sheet 10d (the back side of the adhesive layer 4a) is also attached a release sheet (protective layer, not illustrated) for protecting the anti-reflection film 3a. To the viewing side of the sheet 10d (the viewing side of the anti-reflection film 3a) is also attached an adhesive sheet (not illustrated) for protecting the anti-reflection film 3a. With regard to the sheet 10d in FIG. 18, the adhesive sheet 13 on the outermost surface is illustrated for convenience.

Next, the release sheet on the back side of the sheet 10d is peeled off and, as illustrated in FIG. 19, the sheets 10a and 10d are press-attached using the rollers 11. Thereby, the anti-reflection film 3a and the adhesive sheet 13 are successively stacked on the viewing side surface of the printed matter 2.

Next, the workpiece is cut into a predetermined size using the cutting unit 12 as illustrated in FIG. 17. Thereafter, the adhesive sheet 13 alone is cut using a die-cutting rule such that the adhesive sheet 13 is left in a frame shape on the viewing side surface of the anti-reflection film 3a and the other portion is peeled off. Thereby, the laminated printed matter 1f as illustrated in FIG. 20 is completed. FIG. 20 seems to include no anti-reflection film 3a disposed on the surface of the printed matter 2, but the anti-reflection film 3a is not illustrated for convenience because it is transparent. In fact, the anti-reflection film 3a is disposed on the surface of the printed matter 2.

The process for producing the laminated printed matter of Embodiment 6 requires no processing on the anti-reflection film 3a, and includes only attaching the printed matter 2 and the combination of the anti-reflection film 3a and the adhesive sheet 13, and then peeling part of the adhesive sheet 13. Thus, production of the laminated printed matter is easier than in Embodiment 5.

Embodiments 1 to 6 each show the case using a usual anti-reflection film including an anti-reflection layer including components such as a resin film and an inorganic film. The following Embodiments 7 to 12 each show the case using an anti-reflection film having, on the viewing side surface, an anti-reflection structure (anti-reflection layer) with multiple protrusions disposed at a pitch not greater than the visible light wavelength, i.e., a moth-eye structure (a structure like an eye of moth).

Embodiment 7

Embodiment 7 relates to a laminated printed matter including a printed matter and an anti-reflection film. Difference from Embodiment 1 is use of an anti-reflection film having a moth-eye structure. The laminated printed matter of Embodiment 7 is similar to the laminated printed matter of Embodiment 1 except for the above configuration, and thus the same points are not described here.

(1) Structure of Laminated Printed Matter

Schematic plan views of the laminated printed matter of Embodiment 7 are similar to FIG. 1 and FIG. 2. In the region AR1, a coat to be mentioned later is disposed in a frame shape.

Figure 21:
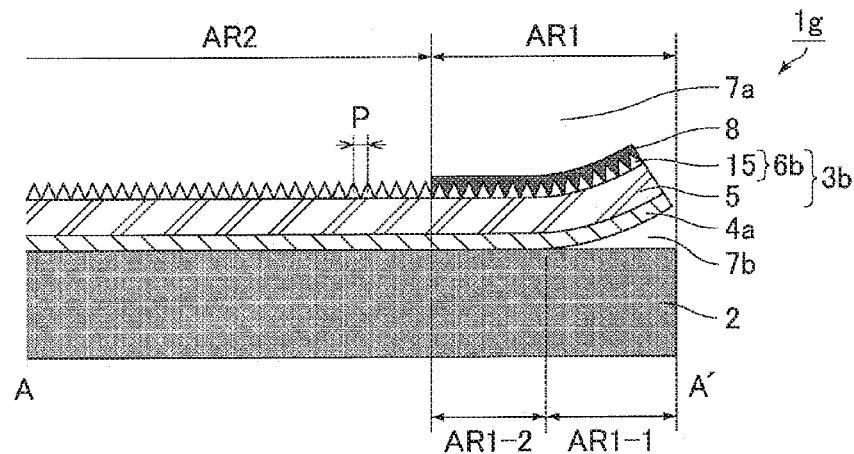
FIG. 21 is a schematic cross-sectional view of the cross section taken along the A-A' line shown in FIG. 2 (Embodiment 7).

FIG. 21 is a schematic cross-sectional view of the cross section taken along the A-A' line shown in FIG. 2 (Embodiment 7). As illustrated in FIG. 21, a laminated printed matter 1g includes, from the back side to the viewing side, the printed matter 2 and an anti-reflection film 3b. The anti-reflection film 3b includes, from the back side to the viewing side, the support 5 and an anti-reflection layer 6b, and attached to the viewing side surface of the printed matter 2 with the adhesive layer 4a in between. The coat 8 is disposed on the viewing side surface of the anti-reflection film 3b in the region AR1. Thereby, the image of the printed matter 2 is observed in the region AR2. Since the laminated printed matter 1g is provided with the coat 8, it is a framed printed matter. The air layer 7a is a space at the viewing side of the laminated printed matter 1g. The air layer 7b is a space formed by peeling of the anti-reflection film 3b from the printed matter 2.

The anti-reflection layer 6b has a moth-eye structure. The pitch P between protrusions 15 (the distance between the vertices of adjacent protrusions 15) constituting the moth-eye structure may be any value not greater than the visible light wavelength (780 nm), and is preferably not smaller than 100 nm and not greater than 700 nm. Each protrusion 15 may have any height, and the height is preferably not lower than 100 nm and not higher than 400 nm. Each protrusion 15 may have any shape, such as a substantially conical shape. In order to form such protrusions 15, the protrusions 15 are preferably formed from resin. The method of forming the anti-reflection layer 6b on the surface of the support 5 (for example, a 100-µm-thick PET film) may be a method disclosed in the above Patent Literature 6. The method disclosed in the above Patent Literature 6 forms macro protrusions and micro protrusions as the moth-eye structure. In the present embodiment, macro protrusions and micro protrusions may be formed, or micro protrusions alone may be formed.

The coat 8 may be any one which makes the light transmittance of the region AR1 lower than the light transmittance of the anti-reflection surface of the anti-reflection film 3b. The coat 8 is preferably a film formed by printing.

The coat 8 may have any thickness, and is preferably 1 µm or greater and 100 µm or smaller in thickness. If the thickness of the coat 8 is smaller than 1 µm, the light transmittance of the region AR1 may fail to be sufficiently lower than that of the anti-reflection surface of the anti-reflection film 3b. If the thickness of the coat 8 is greater than 100 µm, parallax may disadvantageously occur between the region AR1 and the region AR2.

With the laminated printed matter of Embodiment 7, the reflection on (or the absorption of light by) the coat 8 gives substantially the same reflectance to the region AR1-1 where the anti-reflection film 3b is peeled from the printed matter 2 and to the region AR1-2 adjacent to the region AR1-1. Thus, the laminated printed matter of Embodiment 7 can prevent apparently white-tinged images and completely prevent a decrease in image quality of the printed matter.

The laminated printed matter of Embodiment 7 can more improve the image quality of the printed matter than the laminated printed matters of Embodiments 1 to 6. This effect is described hereinbelow.

With the following three anti-reflection films (1) to (3), the reflectances were measured. Table 1 shows the measurement results. The reflectances were measured using a spectrophotometer available from Minolta Co., Ltd. (trade name: CM2002) in a state that each of the anti-reflection films is attached to a printed matter with a black print thereon.

(1) Anti-reflection film including an anti-reflection layer formed from a resin film: anti-reflection film available from Panasonic Corp. (trade name: Fine Tiara)
(2) Anti-reflection film including an anti-reflection layer formed from an inorganic film: anti-reflection film available from Dexerials Corp.
(3) Anti-Reflection Film Having a Moth-Eye Structure The anti-reflection films (1) and (2) are the anti-reflection films used in Embodiments 1 to 6.

The anti-reflection film (3) has the following configuration.
(A) Pitch between protrusions: 200 nm
(B) Height of protrusions: 200 nm
(C) Shape of protrusions: substantially conical shape
(D) Support: 100-µm-thick PET film

TABLE 1

| Anti-reflection layer | Reflectance (%) |
| --- | --- |
| Resin film | 0.50 |
| Inorganic film | 0.26 |
| Moth-eye structure | 0.10 |

Table 1 shows that the anti-reflection film having a moth-eye structure had a significantly lower reflectance than the other anti-reflection films. Such low reflection performance enables expression of jet-blackness. In the case of a printed matter (e.g., a photograph) alone, a region printed by, for example, a red ink may reflect light having a wavelength other than red on the surface of the printed matter. Thus, the color purity was low. In contrast, in the case of a laminated printed matter including an anti-reflection film with a moth-eye structure, a very small amount of light within the visible light region is reflected on the surface. Thus, the natural color of the ink can be expressed without degradation in color purity. Consequently, the laminated printed matter of Embodiment 7 including an anti-reflection film having a moth-eye structure can more improve the image quality of the printed matter than the laminated printed matters of Embodiments 1 to 6. The anti-reflection film including an anti-reflection layer formed from an inorganic film has a reflectance of 0.26%, which is the second best value subsequent to the anti-reflection film having a moth-eye structure. Still, the reflectance thereof depends on the wavelength, so that the reflected light may be colored. This causes observation of coloring the creator does not intend, especially in the case of photographs used in artworks. There is a strong demand for suppressing such a defect. The anti-reflection film having a moth-eye structure does not cause coloring of reflected light. The anti-reflection film including an anti-reflection layer formed from a resin film less causes coloring of reflected light, but the reflectance thereof is 0.50%, which is higher than that of the anti-reflection film having a moth-eye structure.

(2) Process of Producing Laminated Printed Matter

The process for producing the laminated printed matter of Embodiment 7 is similar to the process for producing the laminated printed matter of Embodiment 1 except for using an anti-reflection film having a moth-eye structure.

Embodiment 8

Embodiment 8 relates to a laminated printed matter including a printed matter and an anti-reflection film. Difference from Embodiment 2 is use of an anti-reflection film having a moth-eye structure. The laminated printed matter of Embodiment 8 is similar to the laminated printed matter of Embodiment 2 except for the above configuration, and thus the same points are not described here. The anti-reflection film having a moth-eye structure is as already described in Embodiment 7.

(1) Structure of Laminated Printed Matter

Schematic plan views of the laminated printed matter of Embodiment 8 are similar to FIG. 1 and FIG. 2. In the region AR1, a coat to be mentioned later is disposed in a frame shape.

Figure 22:
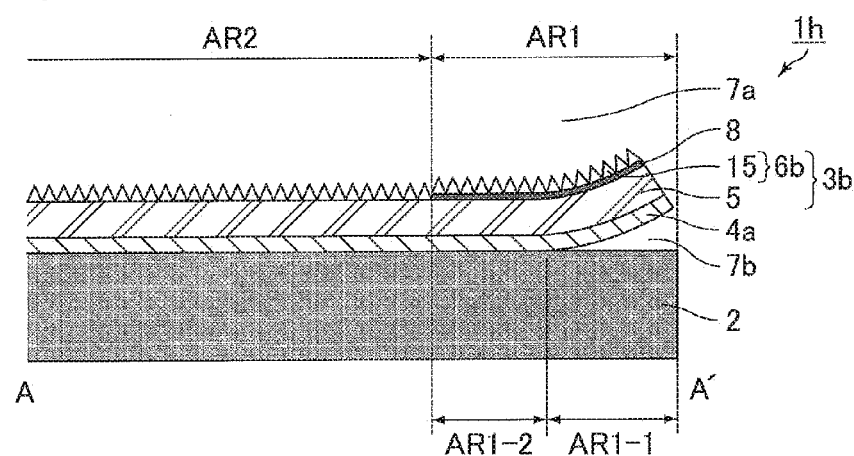
FIG. 22 is a schematic cross-sectional view of the cross section taken along the A-A' line shown in FIG. 2 (Embodiment 8).

FIG. 22 is a schematic cross-sectional view of the cross section taken along the A-A' line shown in FIG. 2 (Embodiment 8). As illustrated in FIG. 22, a laminated printed matter $1h$ includes, from the back side to the viewing side, the printed matter 2 and the anti-reflection film 3b. The anti-reflection film 3b includes, from the back side to the viewing side, the support 5 and the anti-reflection layer 6b having a moth-eye structure, and is attached to the viewing side surface of the printed matter 2 with the adhesive layer 4a in between. The coat 8 is disposed between the support 5 and the anti-reflection layer 6b in the region AR1. Thereby, the image of the printed matter 2 is observed in the region AR2. Since the laminated printed matter $1h$ is provided with the coat 8, it is a framed printed matter. The air layer 7a is a space at the viewing side of the laminated printed matter $1h$. The air layer 7b is a space formed by peeling of the anti-reflection film 3b from the printed matter 2.

The coat 8 may have any thickness, and is preferably 1 μm or greater and 20 μm or smaller in thickness. If the thickness of the coat 8 is smaller than 1 μm, the light transmittance of the region AR1 may fail to be sufficiently lower than that of the anti-reflection surface of the anti-reflection film 3b. If the thickness of the coat 8 is greater than 20 μm, a step is formed by the coat 8, likely causing defects such as sandwiching of air bubbles during formation of the anti-reflection layer 6b. Further, parallax may disadvantageously occur between the region AR1 and the region AR2.

With the laminated printed matter of Embodiment 8, the reflection on (or the absorption of light by) the coat 8 gives substantially the same reflectance to the region AR1-1 where the anti-reflection film 3b is peeled from the printed matter 2 and to the region AR1-2 adjacent to the region AR1-1. Thus, the laminated printed matter of Embodiment 8 can prevent apparently white-tinged images and completely prevent a decrease in image quality of the printed matter. Further, similar to the laminated printed matter of Embodiment 7, the laminated printed matter of Embodiment 8 can further improve the image quality of the printed matter. Further, in the case of the laminated printed matter of Embodiment 8, unlike the laminated printed matter of Embodiment 7, the viewing side surface in the region AR1 also serves as the anti-reflection layer 6b. Thus, the laminated printed matter causes less surface reflection and, if the coat 8 has a color with low reflectance, such as black, the laminated printed matter can have good appearance.

(2) Process of Producing Laminated Printed Matter

The process for producing the laminated printed matter of Embodiment 8 is similar to the process for producing the laminated printed matter of Embodiment 2 except for using an anti-reflection film having a moth-eye structure.

Embodiment 9

Embodiment 9 relates to a laminated printed matter including a printed matter and an anti-reflection film. Difference from Embodiment 3 is use of an anti-reflection film having a moth-eye structure. The laminated printed matter of Embodiment 9 is similar to the laminated printed matter of Embodiment 3 except for the above configuration, and thus the same points are not described here. The anti-reflection film having a moth-eye structure is as already described in Embodiment 7.

(1) Structure of Laminated Printed Matter

Schematic plan views of the laminated printed matter of Embodiment 9 are similar to FIG. 1 and FIG. 2. In the region AR1, a coat to be mentioned later is disposed in a frame shape.

Figure 23:
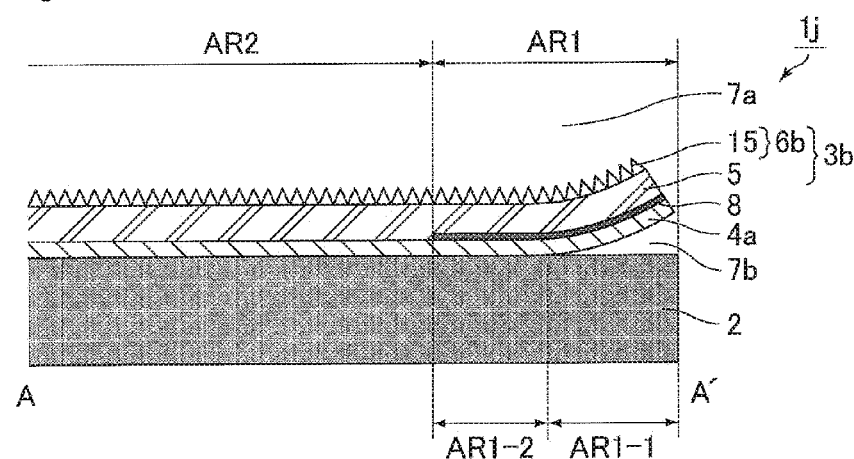
FIG. 23 is a schematic cross-sectional view of the cross section taken along the A-A' line shown in FIG. 2 (Embodiment 9).

FIG. 23 is a schematic cross-sectional view of the cross section taken along the A-A' line shown in FIG. 2 (Embodiment 9). As illustrated in FIG. 23, a laminated printed matter $1j$ includes, from the back side to the viewing side, the printed matter 2 and the anti-reflection film 3b. The anti-reflection film 3b includes, from the back side to the viewing side, the support 5 and the anti-reflection layer 6b having a moth-eye structure, and is attached to the viewing side surface of the printed matter 2 with the adhesive layer 4a in between. The coat 8 is disposed on the back side of the support 5 (between the support 5 and the adhesive layer 4a) in the region AR1. Thereby, the image of the printed matter 2 is observed in the region AR2. Since the laminated printed matter $1j$ is provided with the coat 8, it is a framed printed matter. The air layer 7a is a space at the viewing side of the laminated printed matter $1j$. The air layer 7b is a space formed by peeling of the anti-reflection film 3b from the printed matter 2.

The coat 8 may have any thickness, and is preferably 1 μm or greater and 20 μm or smaller in thickness. If the thickness of the coat 8 is smaller than 1 μm, the light transmittance of the region AR1 may fail to be sufficiently lower than that of the anti-reflection surface of the anti-reflection film 3b. If the thickness of the coat 8 is greater than 20 µm, a step is formed by the coat 8, which also forms a step on the adhesive layer 4a. This may cause defects such as sandwiching of air bubbles during attachment of the printed matter 2 and the anti-reflection film 3b. However, the anti-reflection layer 6b has no step unlike Embodiments 7 and 8. Thus, no parallax occurs between the region AR1 and the region AR2.

With the laminated printed matter of Embodiment 9, the reflection on (or the absorption of light by) the coat 8 gives substantially the same reflectance to the region AR1-1 where the anti-reflection film 3b is peeled from the printed matter 2 and to the region AR1-2 adjacent to the region AR1-1. Thus, the laminated printed matter of Embodiment 9 can prevent apparently white-tinged images and completely prevent a decrease in image quality of the printed matter. Further, similar to the laminated printed matter of Embodiment 7, the laminated printed matter of Embodiment 9 can further improve the image quality of the printed matter. Further, in the case of the laminated printed matter of Embodiment 9, unlike the laminated printed matter of Embodiment 7, the viewing side surface in the region AR1 also serves as the anti-reflection layer 6b. Thus, the laminated printed matter causes less surface reflection and, if the coat 8 has a color with low reflectance, such as black, the laminated printed matter can have good appearance.

(2) Process of Producing Laminated Printed Matter

The process for producing the laminated printed matter of Embodiment 9 is similar to the process for producing the laminated printed matter of Embodiment 3 except for using an anti-reflection film having a moth-eye structure.

Embodiment 10

Embodiment 10 relates to a laminated printed matter including a printed matter and an anti-reflection film. Difference from Embodiment 4 is use of an anti-reflection film having a moth-eye structure. The laminated printed matter of Embodiment 10 is similar to the laminated printed matter of Embodiment 4 except for the above configuration, and thus the same points are not described here. The anti-reflection film having a moth-eye structure is as already described in Embodiment 7.

(1) Structure of Laminated Printed Matter

Schematic plan views of the laminated printed matter of Embodiment 10 are similar to FIG. 1 and FIG. 2. In the region AR1, a coat to be mentioned later is disposed in a frame shape.

Figure 24:
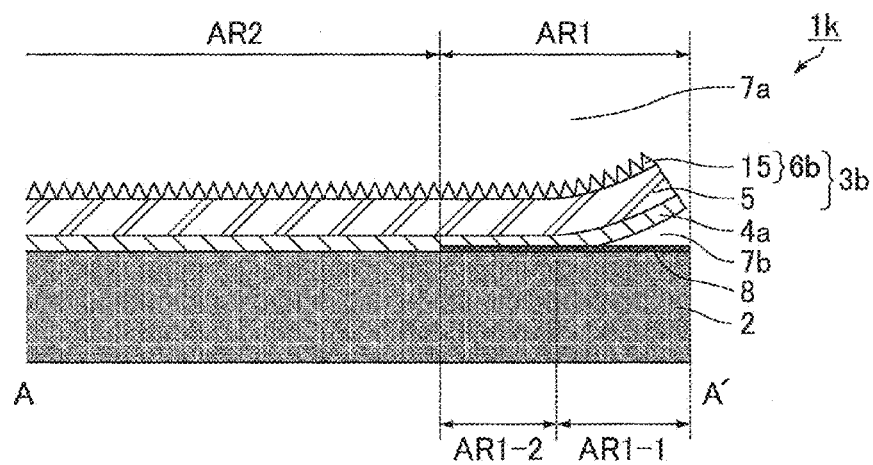
FIG. 24 is a schematic cross-sectional view of the cross section taken along the A-A' line shown in FIG. 2 (Embodiment 10).

FIG. 24 is a schematic cross-sectional view of the cross section taken along the A-A' line shown in FIG. 2 (Embodiment 10). As illustrated in FIG. 24, a laminated printed matter 1k includes, from the back side to the viewing side, the printed matter 2 and the anti-reflection film 3b. The anti-reflection film 3b includes, from the back side to the viewing side, the support 5 and the anti-reflection layer 6b having a moth-eye structure, and is attached to the viewing side surface of the printed matter 2 with the adhesive layer 4a in between. The coat 8 is disposed on the viewing side surface of the printed matter 2 (between the printed matter 2 and the adhesive layer 4a) in the region AR1. Thereby, the image of the printed matter 2 is observed in the region AR2. Since the laminated printed matter 1k is provided with the coat 8, it is a framed printed matter. The air layer 7a is a space at the viewing side of the laminated printed matter 1k. The air layer 7b is a space formed by peeling of the anti-reflection film 3b from the printed matter 2.

The coat 8 may have any thickness, and is preferably 1 µm or greater and 20 µm or smaller in thickness. If the thickness of the coat 8 is smaller than 1 µm, the light transmittance of the region AR1 may fail to be sufficiently lower than that of the anti-reflection surface of the anti-reflection film 3b. If the thickness of the coat 8 is greater than 20 µm, a step is formed by the coat 8, likely causing defects such as sandwiching of air bubbles during attachment of the printed matter 2 and the anti-reflection film 3b.

Since the coat 8 is disposed on the back side of the air layer 7b, the laminated printed matter of Embodiment 10, unlike the laminated printed matters of Embodiments 7 to 9, fails to give substantially the same reflectances to the region AR1-1 where the anti-reflection film 3b is peeled from the printed matter 2 and to the region AR1-2 adjacent to the region AR1-1, but can reduce the difference in reflectance between the regions. Thus, the laminated printed matter of Embodiment 10 is less likely to cause apparently white-tinged images and capable of restraining a decrease in image quality of the printed matter. In order to further restrain apparently white-tinged images, the coat 8 preferably has a color with high reflectance, such as white. This can further reduce the difference in reflectance between the regions AR1-1 and AR1-2. Further, similar to the laminated printed matter of Embodiment 7, the laminated printed matter of Embodiment 10 can further improve the image quality of the printed matter.

(2) Process of Producing Laminated Printed Matter

The process for producing the laminated printed matter of Embodiment 10 is similar to the process for producing the laminated printed matter of Embodiment 4 except for using an anti-reflection film having a moth-eye structure. In this case, processing of the anti-reflection film 3b (formation of the coat 8) is not necessary. Thus, production of the laminated printed matter is easier than in Embodiment 7 to 9.

Embodiment 11

Embodiment 11 relates to a laminated printed matter including a printed matter and an anti-reflection film. Difference from Embodiment 5 is use of an anti-reflection film having a moth-eye structure. The laminated printed matter of Embodiment 11 is similar to the laminated printed matter of Embodiment 5 except for the above configuration, and thus the same points are not described here. The anti-reflection film having a moth-eye structure is as already described in Embodiment 7.

(1) Structure of Laminated Printed Matter

Schematic plan views of the laminated printed matter of Embodiment 11 are similar to FIG. 1 and FIG. 2. As mentioned later, the region AR1 is provided with the support of the anti-reflection film but is not provided with the anti-reflection layer of the anti-reflection film.

Figure 25:
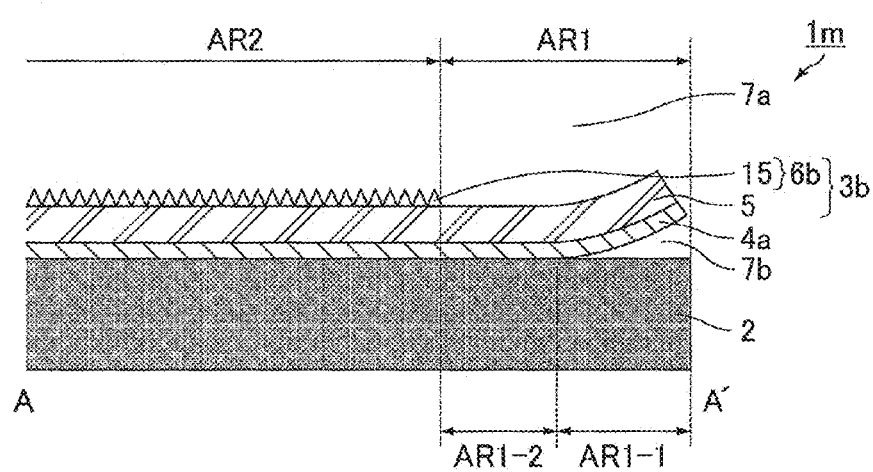
FIG. 25 is a schematic cross-sectional view of the cross section taken along the A-A' line shown in FIG. 2 (Embodiment 11).

FIG. 25 is a schematic cross-sectional view of the cross section taken along the A-A' line shown in FIG. 2 (Embodiment 11). As illustrated in FIG. 25, a laminated printed matter 1m includes, from the back side to the viewing side, the printed matter 2 and the anti-reflection film 3b. The anti-reflection film 3b includes, from the back side to the viewing side, the support 5 and the anti-reflection layer 6b having a moth-eye structure, and is attached to the viewing side surface of the printed matter 2 with the adhesive layer 4a in between. The region AR1 is provided with the support 5 but is not provided with the anti-reflection layer 6b. The air layer 7a is a space at the viewing side of the laminated printed matter 1m. The air layer 7b is a space formed by peeling of the anti-reflection film 3b from the printed matter 2.

In the laminated printed matter of Embodiment 11, the reflectance of the region AR1-1 where the anti-reflection film 3b is peeled from the printed matter 2 is substantially equal to the sum of the reflectance at the interface between the air layer 7a and the support 5 (about 4%), the reflectance at the interface between the adhesive layer 4a and the air layer 7b (about 4%), and the reflectance at the interface between the air layer 7b and the printed matter 2 (about 4%), and is about 12%. The reflectance of the region AR1-2 adjacent to the region AR1-1 is substantially equal to the reflectance at the interface between the air layer 7a and the support 5, and is about 4%. Human eyes tend to be logarithmically sensitive to the reflectance. Thus, they feel that the difference in reflectance between the regions AR1-1 and AR1-2 in the present embodiment is smaller than the difference in reflectance between the regions AR101 and AR102 in the case where the anti-reflection layer is formed on the entire surface as illustrated in FIG. 28. This influence is significant especially in the case of a moth-eye structure whose reflectance is substantially 0%. Thus, the laminated printed matter of Embodiment 11 is less likely to cause apparently white-tinged images and capable of restraining a decrease in image quality of the printed matter. Further, similar to the laminated printed matter of Embodiment 7, the laminated printed matter of Embodiment 11 can further improve the image quality of the printed matter.

(2) Process of Producing Laminated Printed Matter

The process for producing the laminated printed matter of Embodiment 11 is similar to the process for producing the laminated printed matter of Embodiment 5 except for using an anti-reflection film having a moth-eye structure. In this case, the process includes only forming the anti-reflection film 3b in which the anti-reflection layer 6b is not formed in a frame shape on the outer edge, and then attaching the film with the printed matter 2 while aligning the relative positions, and does not require formation of a new film (layer) such as the coat 8 as already mentioned above. Thus, production of the laminated printed matter is easier than in Embodiments 7 to 10.

Embodiment 12

Embodiment 12 relates to a laminated printed matter including a printed matter and an anti-reflection film. Difference from Embodiment 6 is use of an anti-reflection film having a moth-eye structure. The laminated printed matter of Embodiment 12 is similar to the laminated printed matter of Embodiment 6 except for the above configuration, and thus the same points are not described here. The anti-reflection film having a moth-eye structure is as already described in Embodiment 7.

(1) Structure of Laminated Printed Matter

Schematic plan views of the laminated printed matter of Embodiment 12 are similar to FIG. 1 and FIG. 2. In the region AR1, an adhesive sheet to be mentioned later is disposed on the viewing side surface of the anti-reflection film.

Figure 26:
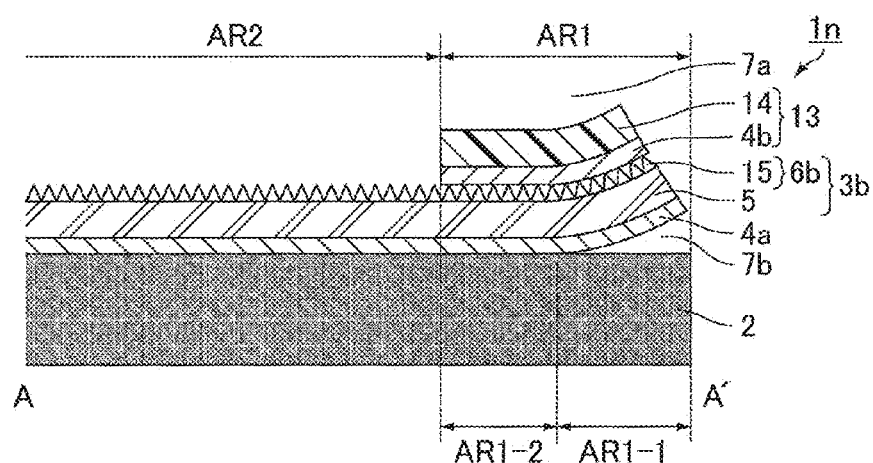
FIG. 26 is a schematic cross-sectional view of the cross section taken along the A-A' line shown in FIG. 2 (Embodiment 12).
Figure 27:
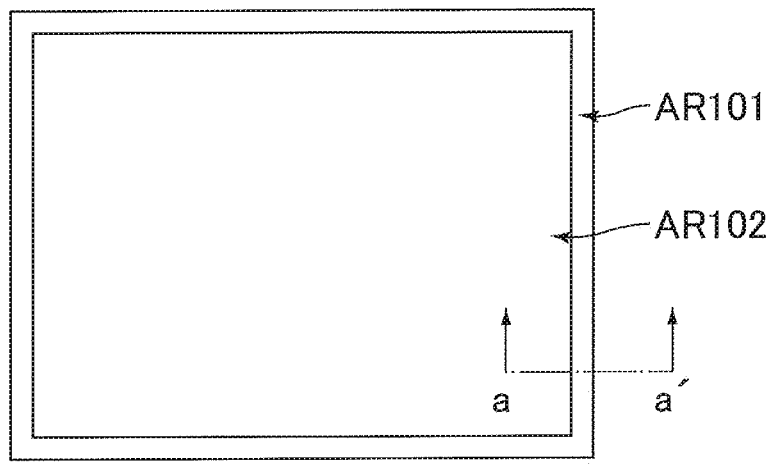
FIG. 27 is a schematic plan view of a conventional laminated printed matter.

FIG. 26 is a schematic cross-sectional view of the cross section taken along the A-A' line shown in FIG. 2 (Embodiment 12). As illustrated in FIG. 26, a laminated printed matter 1n includes, from the back side to the viewing side, the printed matter 2 and the anti-reflection film 3b. The anti-reflection film 3b includes, from the back side to the viewing side, the support 5 and the anti-reflection layer 6b having a moth-eye structure, and is attached to the viewing side surface of the printed matter 2 with the adhesive layer 4a in between. The adhesive sheet 13 is disposed on the viewing side surface of the anti-reflection film 3b in the region AR1. The adhesive sheet 13 includes, from the back side to the viewing side, the adhesive layer 4b and the protective layer 14. The air layer 7a is a space at the viewing side of the laminated printed matter 1n. The air layer 7b is a space formed by peeling of the anti-reflection film 3b from the printed matter 2.

In the laminated printed matter of Embodiment 12, the reflectance of the region AR1-1 where the anti-reflection film 3b is peeled from the printed matter 2 is substantially equal to the sum of the reflectance at the interface between the air layer 7a and the protective layer 14 (about 4%), the reflectance at the interface between the adhesive layer 4a and the air layer 7b (about 4%), and the reflectance at the interface between the air layer 7b and the printed matter 2 (about 4%), and is about 12%. The reflectance of the region AR1-2 adjacent to the region AR1-1 is substantially equal to the reflectance at the interface between the air layer 7a and the protective layer 14, and is about 4%. Human eyes tend to be logarithmically sensitive to the reflectance. Thus, they feel that the difference in reflectance between the regions AR1-1 and AR1-2 in the present embodiment is smaller than the difference in reflectance between the regions AR101 and AR102 in the case where the anti-reflection layer is formed on the entire surface as illustrated in FIG. 28. This influence is significant especially in the case of a moth-eye structure whose reflectance is substantially 0%. Thus, the laminated printed matter of Embodiment 12 is less likely to cause apparently white-tinged images and capable of restraining a decrease in image quality of the printed matter. In order to further restrain apparently white-tinged images, the adhesive sheet 13 is preferably a nontransparent one. Further, similar to the laminated printed matter of Embodiment 7, the laminated printed matter of Embodiment 12 can further improve the image quality of the printed matter.

(2) Process of Producing Laminated Printed Matter

The process for producing the laminated printed matter of Embodiment 12 is similar to the process for producing the laminated printed matter of Embodiment 6 except for using an anti-reflection film having a moth-eye structure. In this case, processing of the anti-reflection film 3b is not necessary and the process includes only attaching the printed matter 2 and the combination of the anti-reflection film 3b and the adhesive sheet 13, and then peeling part of the adhesive sheet 13. Thus, production of the laminated printed matter is easier than in Embodiment 11.

ADDITIONAL REMARKS

The following describes preferred embodiments of the laminated printed matter of the present invention. These embodiments may be appropriately combined within the scope of the spirit of the present invention.

The light transmittance of the frame-like region may have any value that is lower than the light transmittance of the anti-reflection surface of the anti-reflection film. In order to further restrain apparently white-tinged images, the light transmittance of the frame-like region is preferably 10% or lower, more preferably 5% or lower. From the same viewpoint, the difference in light transmittance between the anti-reflection surface of the anti-reflection film and the frame-like region is preferably 70% or higher, more preferably 85% or higher.

The frame-like region may have a configuration in which the reflectance or absorptivity thereof is higher than that of the anti-reflection surface of the anti-reflection film. If the reflectance is higher, the reflectance of a region around the region where the anti-reflection film is peeled from the printed matter is made close to the reflectance of such a region, less likely causing apparently white-tinged images. In contrast, if the absorptivity is higher, a smaller amount of visible light is reflected on the interface with the portion where the anti-reflection film is peeled from the printed matter. Thus, the difference in reflectance is reduced between the region where the anti-reflection film is peeled from the printed matter and the region therearound.

The frame-like region may be a region where a coat is disposed in a frame shape. Thereby, the frame-like region can be effectively used by utilizing the effect of reflection on (or light absorption by) the coat. For example, if the coat is white, the reflectance is high. If the coat is black, the reflectance is low but the absorptivity is high.

The coat may be disposed on the viewing side surface of the anti-reflection film. Thereby, in the frame-like region, the region where the anti-reflection film is peeled from the printed matter and the region therearound show substantially the same reflectance. This prevents apparently white-tinged images and can completely prevent a decrease in image quality of the printed matter.

The anti-reflection film may include a support and an anti-reflection layer disposed on the viewing side surface of the support, and the coat may be disposed between the support and the anti-reflection layer. Thereby, in the frame-like region, the region where the anti-reflection film is peeled from the printed matter and the region therearound show substantially the same reflectance. This prevents apparently white-tinged images and can completely prevent a decrease in image quality of the printed matter. Further, the viewing side surface of the frame-like region also serves as the anti-reflection layer. This restrains surface reflection, providing good appearance.

The coat may be disposed between the printed matter and the anti-reflection film. In this case, if the coat is disposed on the back side of the anti-reflection film and is integrated therewith, the region where the anti-reflection film is peeled from the printed matter and the region therearound show substantially the same reflectance in the frame-like region. This prevents apparently white-tinged images and can completely prevent a decrease in image quality of the printed matter. Further, the viewing side surface of the frame-like region also serves as the anti-reflection layer. This restrains surface reflection, providing good appearance. If the coat is disposed on the viewing side surface of the printed matter and is integrated therewith, the difference in reflectance can be decreased between the region where the anti-reflection film is peeled from the printed matter and the region therearound in the frame-like region. In order to further decrease the difference in reflectance, the coat preferably has a color with high reflectance, such as white. In addition, processing (formation of the coat) on the anti-reflection film is not required, so that the laminated printed matter can be easily produced.

The anti-reflection film may include a support and an anti-reflection layer disposed on the viewing side surface of the support, and the frame-like region may be a region where the support is disposed but the anti-reflection layer is not disposed. Thereby, utilizing the effect that the reflectance is increased in the frame-like region, the difference in reflectance can be decreased between the region where the anti-reflection film is peeled from the printed matter and the region therearound in the frame-like region. In addition, formation of a new film (layer) such as the coat is not required, so that the laminated printed matter can be easily produced.

The frame-like region may be a region where an adhesive sheet is disposed in a frame shape on the viewing side surface of the anti-reflection film. Thereby, utilizing the effect that the reflectance is increased in the frame-like region, the difference in reflectance can be decreased between the region where the anti-reflection film is peeled from the printed matter and the region therearound in the frame-like region. In addition, no processing on the anti-reflection film is required, so that the laminated printed matter can be easily produced.

The adhesive sheet may be nontransparent. This further restrains apparently white-tinged images.

The anti-reflection film may have, on the viewing side surface thereof, an anti-reflection structure with multiple protrusions disposed at a pitch not greater than the visible light wavelength. This enables suitable application of the present invention even to the laminated printed matter including an anti-reflection film having a moth-eye structure. In addition, the image quality of the printed matter can be further improved.

REFERENCE SIGNS LIST $1a$, $1b$, $1c$, $1d$, $1e$, $1f$, $1g$, $1h$, $1j$, $1k$, $1m$, $1n$, 101: laminated printed matter
2, 102: printed matter
$3a$, $3b$, 103: anti-reflection film
$4a$, $4b$, 104: adhesive layer
5, 105: support
$6a$, $6b$, 106: anti-reflection layer
$7a$, $7b$, $107a$, $107b$: air layer
8: coat
9: laminating device
$10a$, $10b$, $10c$, $10d$: sheet
11: roller
12: cutting unit
13: adhesive sheet
14: protective layer
15: protrusion
AR1, AR101: region (frame-like region)
AR2, AR102: region (region other than frame-like region)
AR1-1, AR1-2: region (region inside frame-like region)
W: width
P: pitch

The invention claimed is:

1. A laminated printed matter comprising
a printed matter, and
an anti-reflection film,
the anti-reflection film being attached to a viewing side surface of the printed matter,
the laminated printed matter being provided with a frame-like region having a lower light transmittance than an anti-reflection surface of the anti-reflection film on an outer edge.

2. The laminated printed matter according to claim 1, wherein the frame-like region is a region where a coat is disposed in a frame shape.

3. The laminated printed matter according to claim 2, wherein the coat is disposed on a viewing side surface of the anti-reflection film.

4. The laminated printed matter according to claim 2, wherein the anti-reflection film includes a support and an anti-reflection layer disposed on a viewing side surface of the support, and
the coat is disposed between the support and the anti-reflection layer.

5. The laminated printed matter according to claim 2, wherein the coat is disposed between the printed matter and the anti-reflection film.

6. The laminated printed matter according to claim 1, wherein the anti-reflection film includes a support and an anti-reflection layer disposed on a viewing side surface of the support, and
the frame-like region is a region where the support is disposed but the anti-reflection layer is not disposed.

7. The laminated printed matter according to claim 1, wherein the frame-like region is a region where an adhesive sheet is disposed in a frame shape on a viewing side surface of the anti-reflection film.

8. The laminated printed matter according to claim 7, wherein the adhesive sheet is nontransparent.

9. The laminated printed matter according to claim 1, wherein the anti-reflection film has, on a viewing side surface thereof, an anti-reflection structure with multiple protrusions disposed at a pitch not greater than the visible light wavelength.

* * * * *